US010791701B2

United States Patent
Zemet

(10) Patent No.: US 10,791,701 B2
(45) Date of Patent: Oct. 6, 2020

(54) COLLAPSIBLE SOUND REDUCING PET CONTAINER

(71) Applicant: Kaitlin N. Zemet, North Hollywood, CA (US)

(72) Inventor: Kaitlin N. Zemet, North Hollywood, CA (US)

( * ) Notice: Subject to any disclaimer, the term of this patent is extended or adjusted under 35 U.S.C. 154(b) by 189 days.

(21) Appl. No.: 15/706,650

(22) Filed: Sep. 15, 2017

(65) Prior Publication Data

US 2018/0092329 A1  Apr. 5, 2018

Related U.S. Application Data

(60) Provisional application No. 62/395,287, filed on Sep. 15, 2016.

(51) Int. Cl.
*A01K 1/00* (2006.01)
*A01K 1/03* (2006.01)

(52) U.S. Cl.
CPC .......... *A01K 1/0052* (2013.01); *A01K 1/0035* (2013.01); *A01K 1/0047* (2013.01); *A01K 1/034* (2013.01)

(58) Field of Classification Search
CPC .. A01K 1/0035; A01K 1/0047; A01K 1/0052; A01K 1/034
USPC .......................................... 119/482, 498, 500
See application file for complete search history.

(56) References Cited

U.S. PATENT DOCUMENTS

| | | |
|---|---|---|
| 5,575,239 A | 11/1996 | Bradburn et al. |
| 5,727,501 A | 3/1998 | York |
| 5,839,392 A * | 11/1998 | Pemberton ........... A01K 1/0245 119/498 |
| 5,960,744 A | 10/1999 | Rutman |
| 5,964,190 A | 10/1999 | Willinger et al. |
| 5,967,090 A * | 10/1999 | Hui ....................... A01K 1/0245 119/453 |
| 6,382,351 B1 * | 5/2002 | Lastowski ............. A01K 29/00 119/168 |
| 6,490,995 B2 * | 12/2002 | Greene, Jr. .......... A01K 1/0236 119/482 |
| 6,863,030 B2 | 3/2005 | Axelrod |
| 6,997,138 B1 | 2/2006 | Simpson |

(Continued)

OTHER PUBLICATIONS

Serenity Dog crate; http://web.archive.org/web/20150312073957/http://www.serenitydogcrate.com/; dated Nov. 19, 2016.

(Continued)

*Primary Examiner* — David J Parsley
(74) *Attorney, Agent, or Firm* — Burdick Patents, P.A.; Sean D. Burdick

(57) ABSTRACT

A collapsible sound reducing pet container when fully assembled forms an enclosure having a generally rectangular volume with manually disassembleable top, bottom, front, rear, left, and right panels. The front panel defines a cutout having an area less than that of the front panel, and at least one of the panels comprises multiple layers of dissimilar soundproofing material. An electric fan, mounted to one of the panels, becomes energized in response to presence of an animal within the enclosure. Each of the top, front, rear, left and right panels is sized to allow all of the panels to be stacked between and enclosed within the top and bottom panels, to collapse the container for transport and storage.

11 Claims, 20 Drawing Sheets

(56) References Cited

U.S. PATENT DOCUMENTS

| | | | |
|---|---|---|---|
| 7,011,046 B1* | 3/2006 | Kidwell | A01K 1/0047 |
| | | | 119/657 |
| 7,051,679 B2 | 5/2006 | Bello | |
| 7,178,855 B2 | 2/2007 | Catron et al. | |
| 7,237,509 B2 | 7/2007 | Bonner et al. | |
| 7,363,879 B2 | 4/2008 | Bonner et al. | |
| 7,527,022 B2 | 5/2009 | Bonner et al. | |
| 7,721,678 B2 | 5/2010 | Jakubowski et al. | |
| 7,802,540 B2 | 9/2010 | Jakubowski et al. | |
| 7,997,234 B1* | 8/2011 | Hughey | A01K 1/034 |
| | | | 119/496 |
| 8,069,820 B2 | 12/2011 | Anderson | |
| 8,141,518 B2 | 3/2012 | Pierpont | |
| 8,276,544 B2* | 10/2012 | Seltzer | A01K 1/0236 |
| | | | 119/496 |
| 8,347,815 B2 | 1/2013 | Leung | |
| 8,387,747 B2 | 3/2013 | Koike et al. | |
| 8,544,418 B2 | 10/2013 | Jiang et al. | |
| 8,607,740 B2 | 12/2013 | Webb | |
| 8,662,020 B1 | 3/2014 | Tecco | |
| 8,863,696 B1 | 10/2014 | Lee | |
| 8,915,216 B2 | 12/2014 | Hoegh et al. | |
| 8,944,010 B2 | 2/2015 | Willard | |
| 2005/0284405 A1* | 12/2005 | Pomakoy-Poole | |
| | | | A01K 1/0245 |
| | | | 119/497 |
| 2006/0137621 A1* | 6/2006 | Foresman | A01K 1/033 |
| | | | 119/482 |
| 2007/0289549 A1* | 12/2007 | Villa Cervantes | A01K 13/001 |
| | | | 119/668 |

OTHER PUBLICATIONS

EsionPet Quiet Time crate; https://www.facebook.com/EsionPet/; dated Nov. 19, 2016.

Audimute; http://www.audimutesoundproofing.com/dog-kennel-sounds-stop-barking-dogs-stop-barking-dogs.aspx; dated Nov. 19, 2016.

Kennel Soundproofing http://www.controlnoise.com/soundproofing-a-kennel/; dated Nov. 19, 2016.

Zen crate; http://www.petguide.com/blog/dog/zencrate-combines-music-and-a-den-for-noise-sensitive-dogs/; dated Nov. 19, 2016.

Pet Nation port-a-crate; https://www.amazon.com/Petnation-Indoor-Outdoor-20-Inch-Pounds/dp/B0007IOYIE; dated Nov. 19, 2016.

Dura-Ruff folding pet den; http://www.drsfostersmith.com/product/prod_display.cfm?pcatid=19297; dated Nov. 19, 2016.

Impact Case Dog crate; https://www.youtube.com/watch?v=axzbTfQ8stY; Nov. 19, 2016.

Impact Dog crates; https://www.impactdogcrates.com/collections/crates; Nov. 19, 2016.

Guardian Gear collapsible dog crate; https://www.amazon.com/Guardian-Collapsible-Folding-Portable-Crate/dp/B000O9SE5K; Nov. 19, 2016.

Midwest Life Stages dog crate; https://www.amazon.com/MidWest-Stages-Folding-Metal-Crate/dp/B0002AT3M4; Nov. 19, 2016.

* cited by examiner

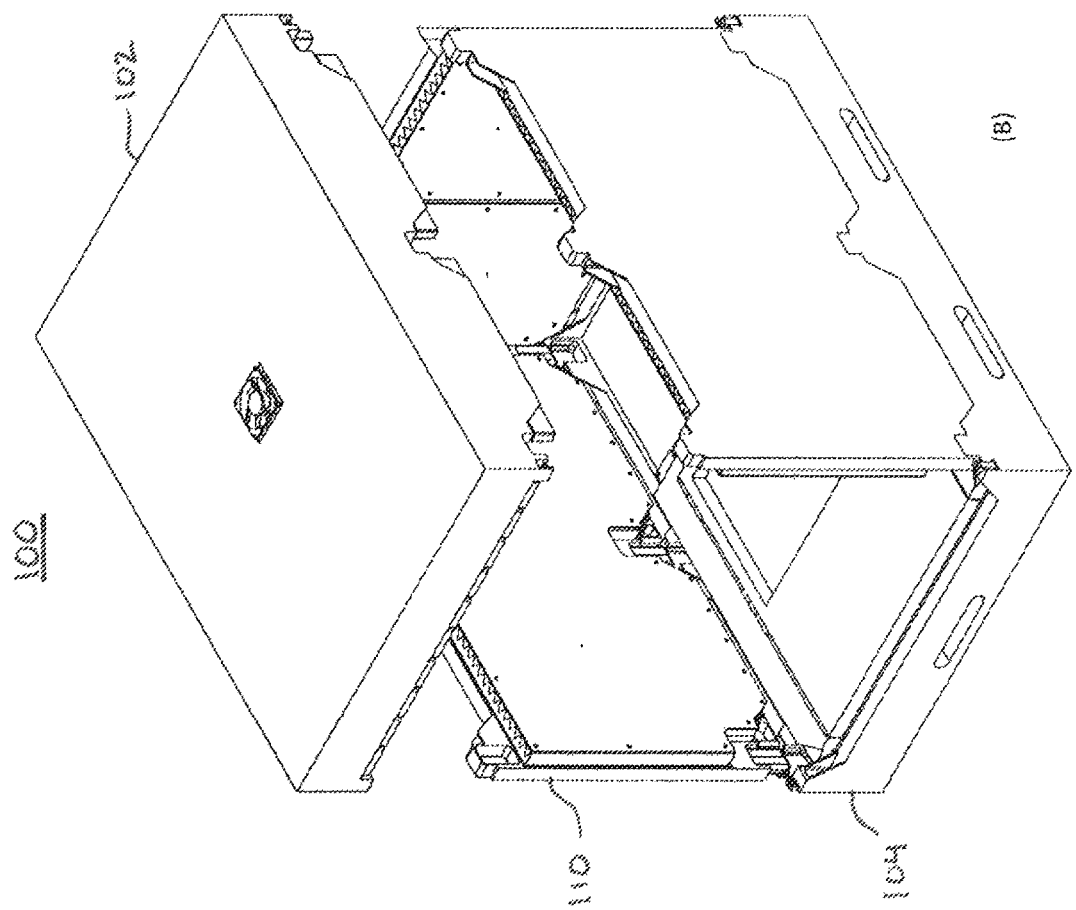
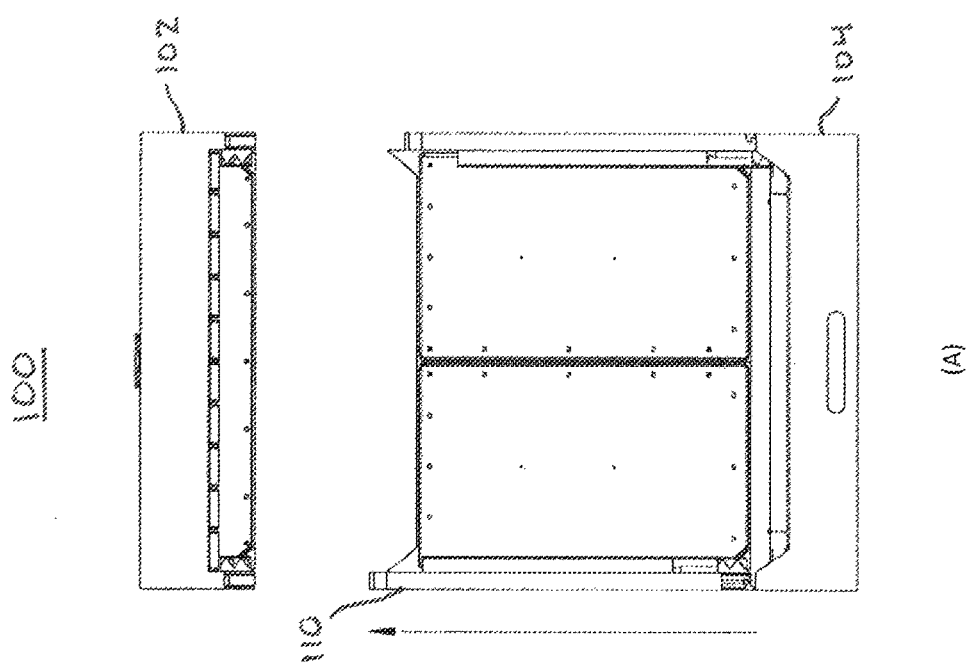
FIG. 14

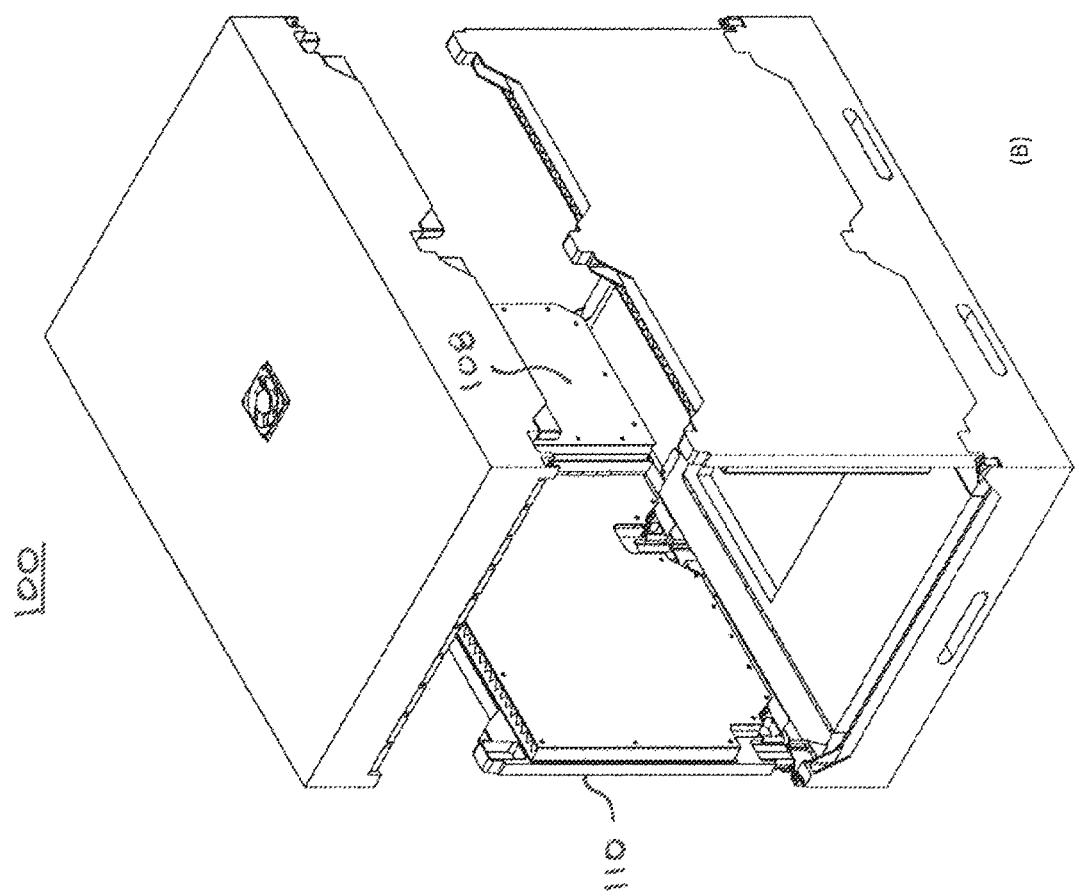
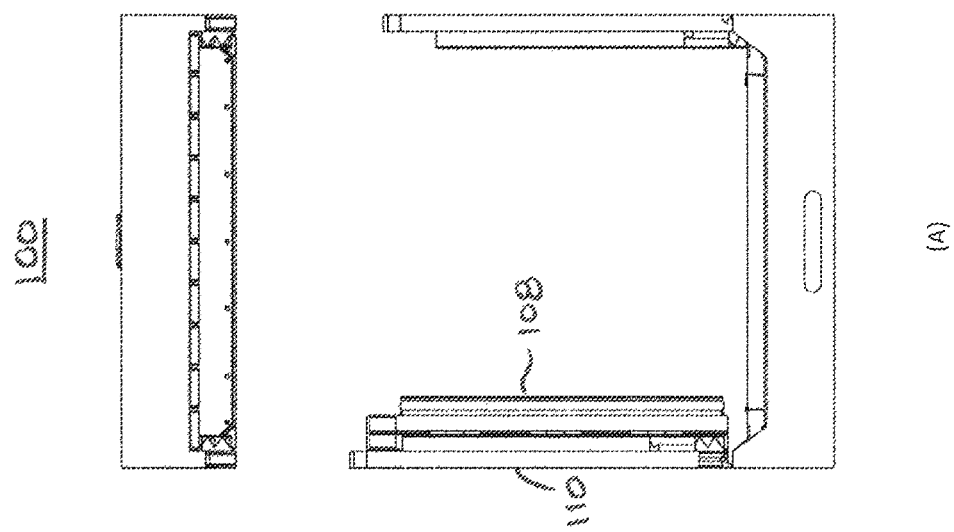
FIG. 15

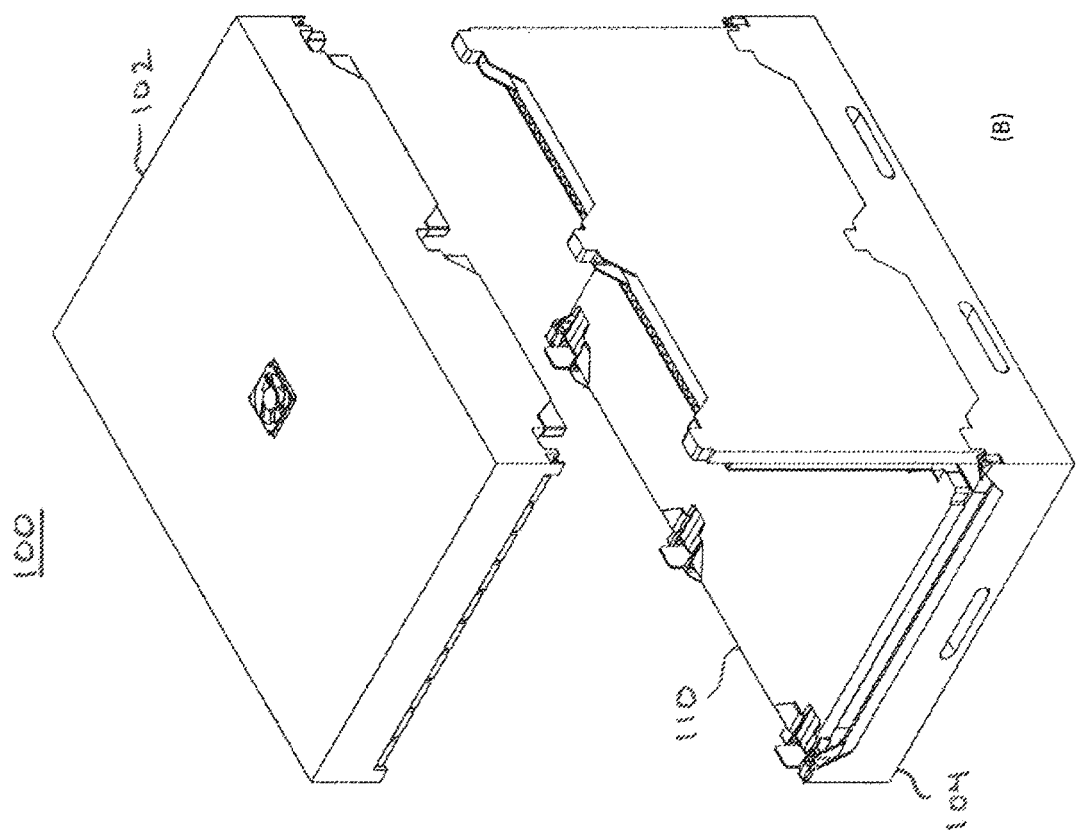
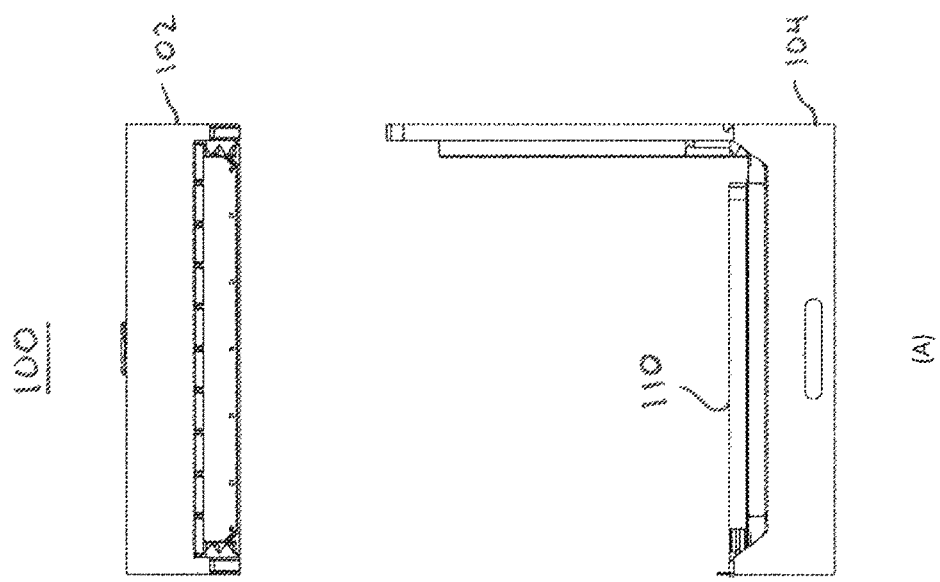
FIG. 16

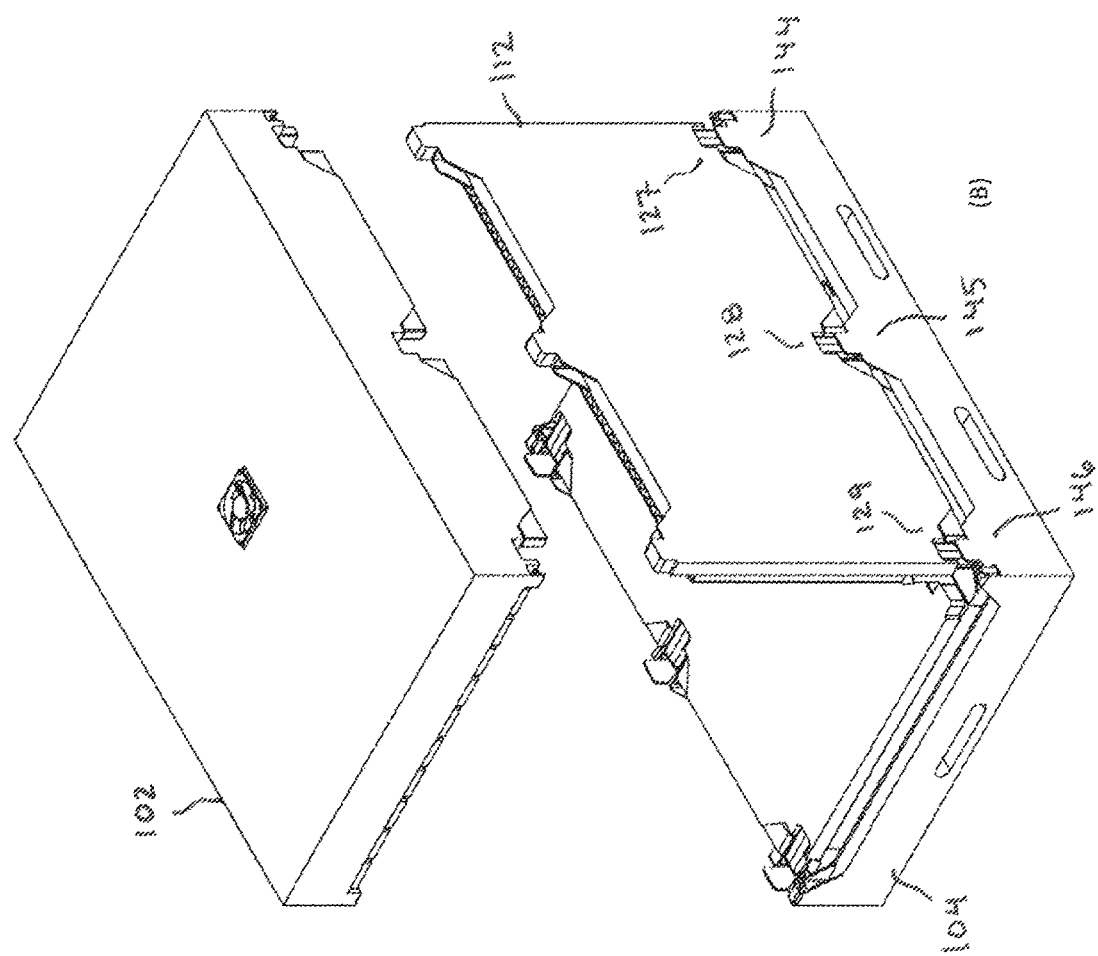
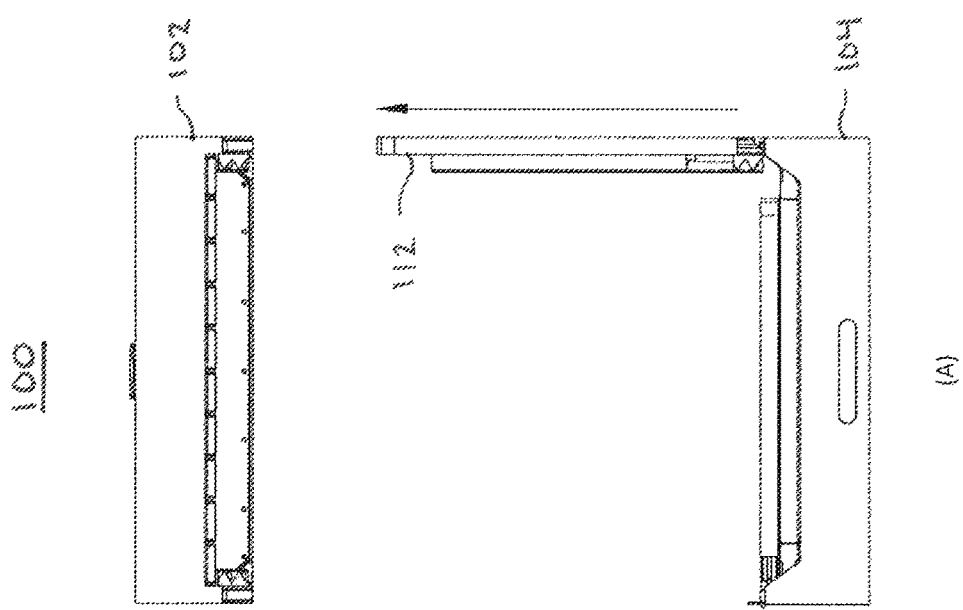
FIG. 17

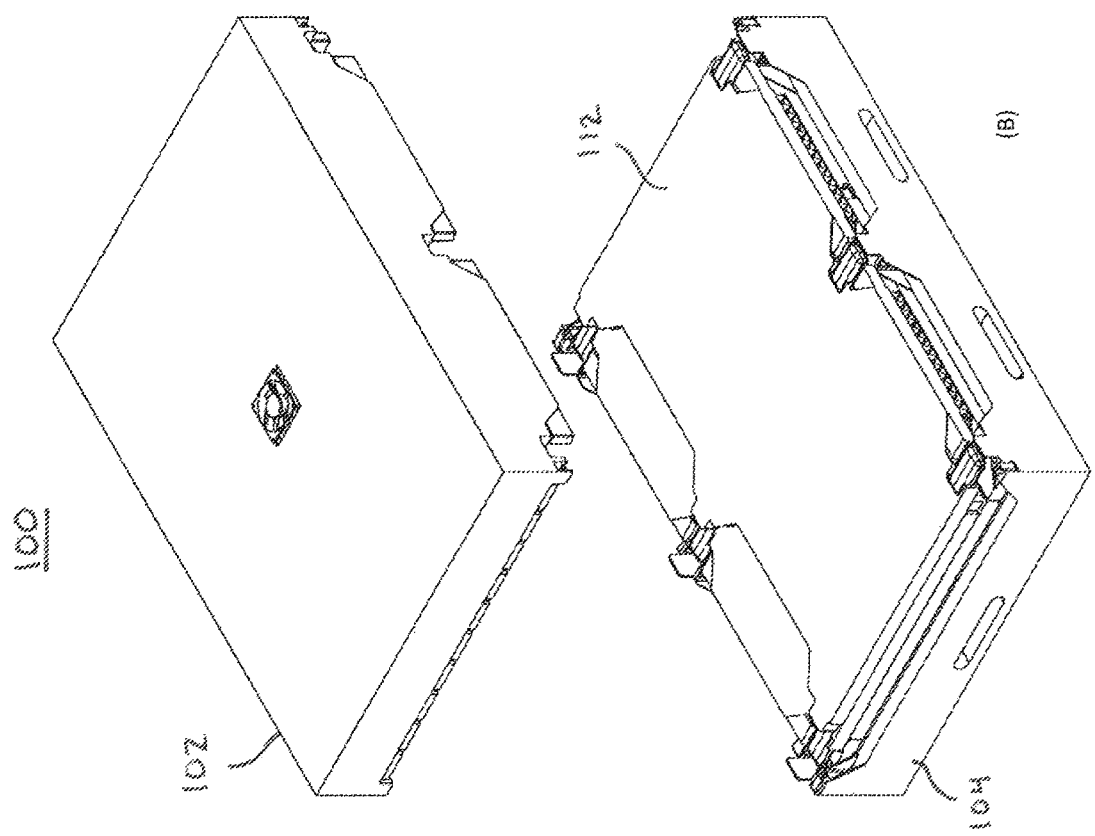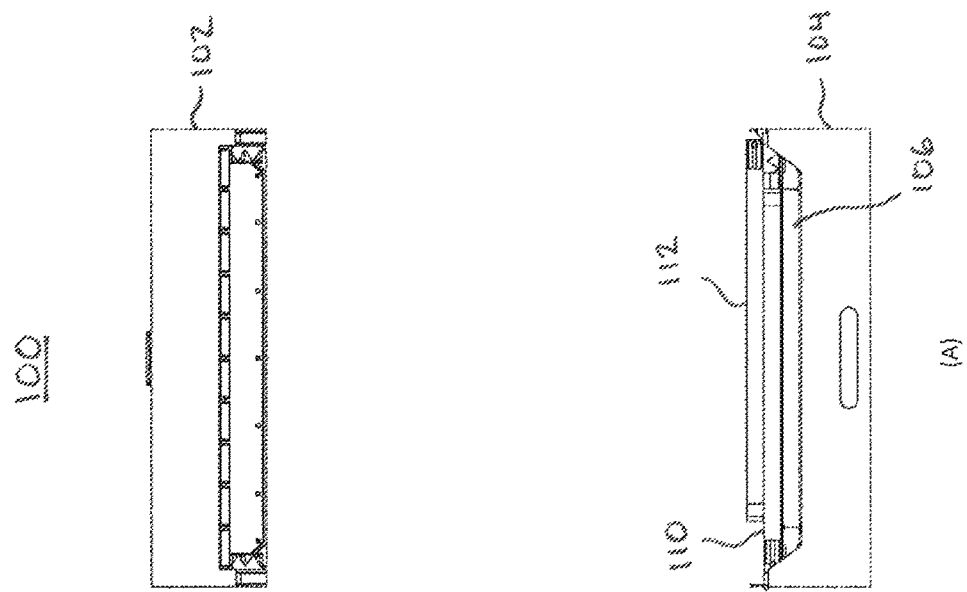
FIG. 18

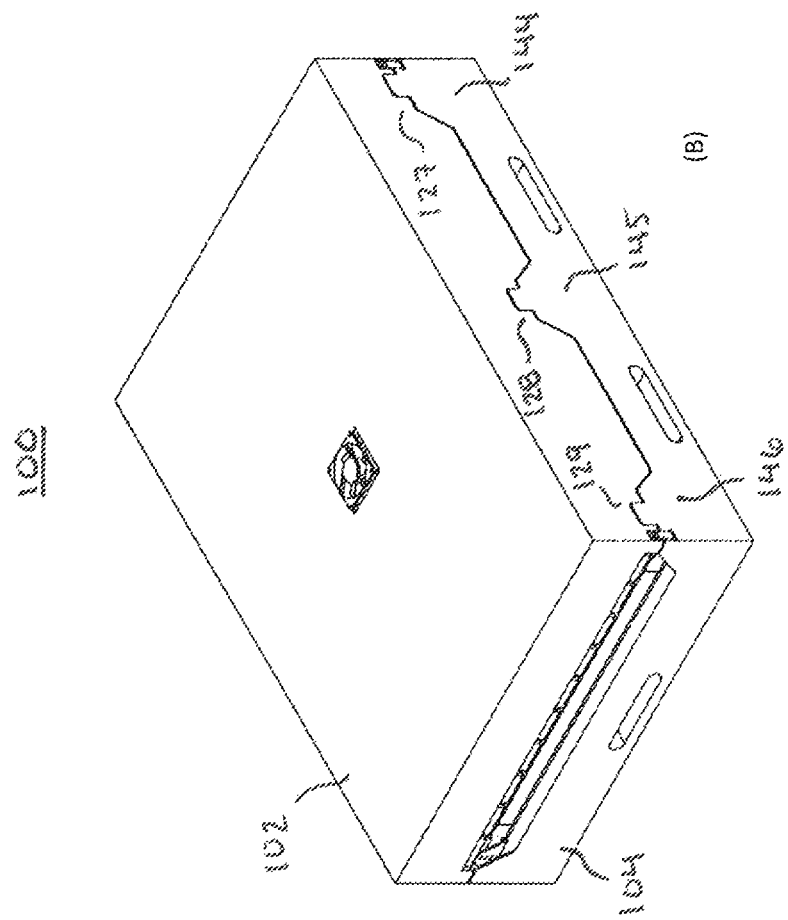
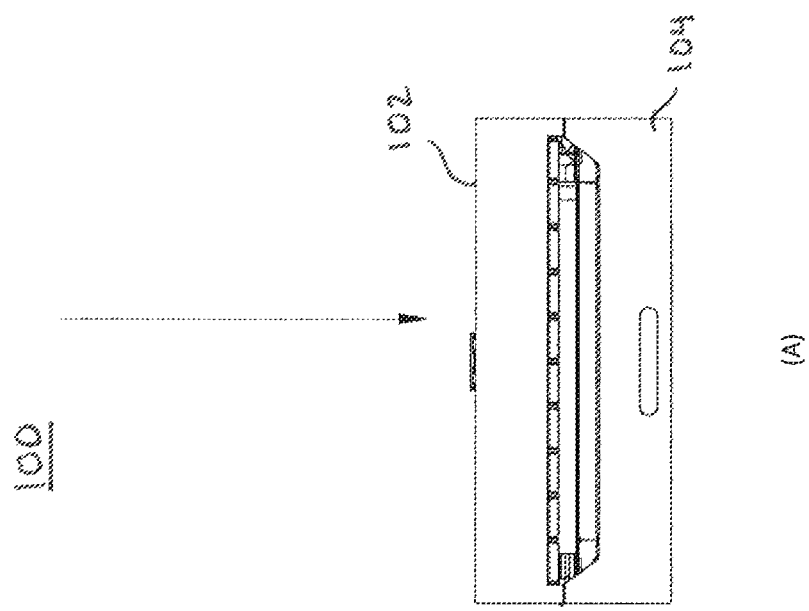
FIG. 19

COLLAPSIBLE SOUND REDUCING PET CONTAINER

This application claims priority to U.S. Provisional Application 62/395,287, which was filed on Sep. 15, 2016 and which is fully incorporated herein by reference.

BACKGROUND OF THE INVENTION

Field of the Invention

The present invention relates generally to pet containers such as dog houses and dog crates, and more specifically, the invention relates to pet containers designed to muffle interior noise such as that of a barking dog. Most specifically the invention relates to a collapsible sound reducing dog container with automatic ventilation.

Description of Related Art

Pet containers such as dog houses and dog crates are well known in the art. Dog crates, in particular, allow a dog owner to train a dog to become accustomed to lying in repose in a confined space. Ideally, the successfully crate-trained dog obediently retreats to the crate on command, where it finds security and comfort and where it has learned to rest quietly.

Unfortunately, not all dogs are amenable to crate training. And for those dogs that can be successfully crate trained, such success is not achieved overnight. When crated, untrainable dogs and dogs in training sometimes bark incessantly to the annoyance of neighbors and dog owners alike. Some dogs that are apparently crate trained behave well when crated, provided that their owner is close by. But when left alone for longer periods of time, the apparently crate trained dog will begin to whine and bark.

Dog houses, dog crates, and other pet containers that are currently available are not designed to muffle the sound of a noisy animal. To ensure the comfort and health of the animal, pet containers cannot be fully enclosed, otherwise the animal may overheat or be deprived of oxygen. Known containers are typically made of wire mesh for proper ventilation, or may be more fully enclosed except for a caged opening that allows for the animal's egress. In either case, the enclosure materials are inherently unable to reduce noise, and so the sound of a barking dog is allowed to emanate freely from within the enclosure.

The inability of pet container designs to silence a noisy animal also means that the containers fail to shield against exterior noises that may be upsetting to the animal. For example, many dogs are especially sensitive to the sound of exploding fireworks or gunshots, and may need to retreat to an enclosed space, such as a garage, to seek peace and quiet. But although the garage walls may protect the ear of a human, they are often inadequate to shield canine ears from the fearful sound of fireworks.

What is needed is a pet container that is able to provide adequate ventilation, that can muffle the sound of a noisy animal, and that can shield against external noise that is irritating to certain pets.

SUMMARY OF THE INVENTION

The present invention discloses a creative design for a sound reducing pet container that overcomes the problems inherent in prior designs. The pet container of the present invention advantageously provides for animal comfort while muffling the sounds of a noisy animal, and provides a collapsible construction for ease of transport and set-up. A further advantage of the invention is its ability to calms dogs or other pets that suffer from separation anxiety, or that are otherwise unnerved by loud noise, by diminishing noise emanating from sources outside the container.

In one embodiment of the invention, a collapsible sound reducing pet container includes an enclosure having a generally rectangular volume with top, bottom, front, rear, left, and right panels. The front panel defines a cutout having an area less than that of the front panel, and at least one of the panels comprises multiple layers of dissimilar soundproofing material. An electric fan is mounted to one of the panels, and a means is provided for energizing the fan responsive to presence of an animal within the enclosure. Each of the front, rear, left, and right panels may be manually removable to allow each of said panels to stack on or above the bottom panel and be enclosed within the top and bottom panels.

Various additional embodiments provide other advantageous features. For example, in one embodiment, the enclosure of a pet container according to the invention defines an internal volume suitable to accommodate most every breed of dog. The internal volume may be about eight cubic feet, or may be scaled to provide a larger or smaller enclosure volume. In another embodiment, the pet container may further comprise an air permeable material covering the cutout area. For improved soundproofing, the cutout area and associated air permeable material may each be less than one eighth of the area of the front panel.

In a more elaborate embodiment of the invention, the multiple layers of dissimilar soundproofing material used to form the panels may include a layer of acoustic foam and a layer of sound board covered in mass loaded vinyl. The layer of acoustic foam may be adjacent to the layer of sound board that is covered in mass loaded vinyl. In another embodiment, at least one of the panels of the pet container may comprise an inner liner and an outer structural layer, wherein the multiple layers of dissimilar soundproofing material are located between the inner liner and the outer structural layer. In another embodiment, the inner liner may comprise neoprene.

To ensure adequate ventilation for live animals contained therein, the electric fan of the pet container may be mounted to, and penetrate, the top panel to force air through the top panel into or out of the enclosure. The means for energizing the electric fan may comprise one or more of a manual switch, a door switch, and a pressure switch that is mounted to the bottom panel. These switches may be connected in various series and parallel configurations, to provide power to the electric fan only under certain conditions, such as when the presence of an animal is detected within the enclosure.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

FIG. 14 includes frontal (A) and isometric (B) views illustrating a subsequent step in the process for collapsing the container of FIG. 1, showing a left-hand panel being lifted from a mounted position in the bottom panel.

FIG. 15 includes frontal (A) and isometric (B) views illustrating a subsequent step in the process for collapsing the container of FIG. 1, showing a back panel folded and positioned against the interior of the left-hand panel.

FIG. 16 includes frontal (A) and isometric (B) views illustrating a subsequent step in the process for collapsing the container of FIG. 1, showing the left-hand panel folded down to rest on the bottom panel.

FIG. 17 includes frontal (A) and isometric (B) views illustrating a subsequent step in the process for collapsing the container of FIG. 1, showing the right-hand panel being lifted from a mounted position in the bottom panel.

FIG. 18 includes frontal (A) and isometric (B) views illustrating a subsequent step in the process for collapsing the container of FIG. 1, showing the right-hand panel folded down to rest on the bottom panel.

FIG. 19 includes frontal (A) and isometric (B) views illustrating the final step in the process for collapsing the container of FIG. 1, showing the top panel engaging the bottom panel and enclosing the collapsed front, rear, left-hand, and right-hand panels.

DETAILED DESCRIPTION OF THE INVENTION

The following disclosure presents exemplary embodiments for a soundproof, or sound reducing pet container. The pet container of the present invention advantageously provides for animal comfort while muffling the sounds of a noisy animal, and also features collapsible construction for ease of transport and set-up. The invention is suitable for use with existing apparatus such as dog crates, by enclosing the dog crate within the volume of the collapsible sound reducing pet container when the container is fully expanded to its maximum volume. The invention may also be used as a stand-alone solution for safely enclosing an animal.

Figure 1:
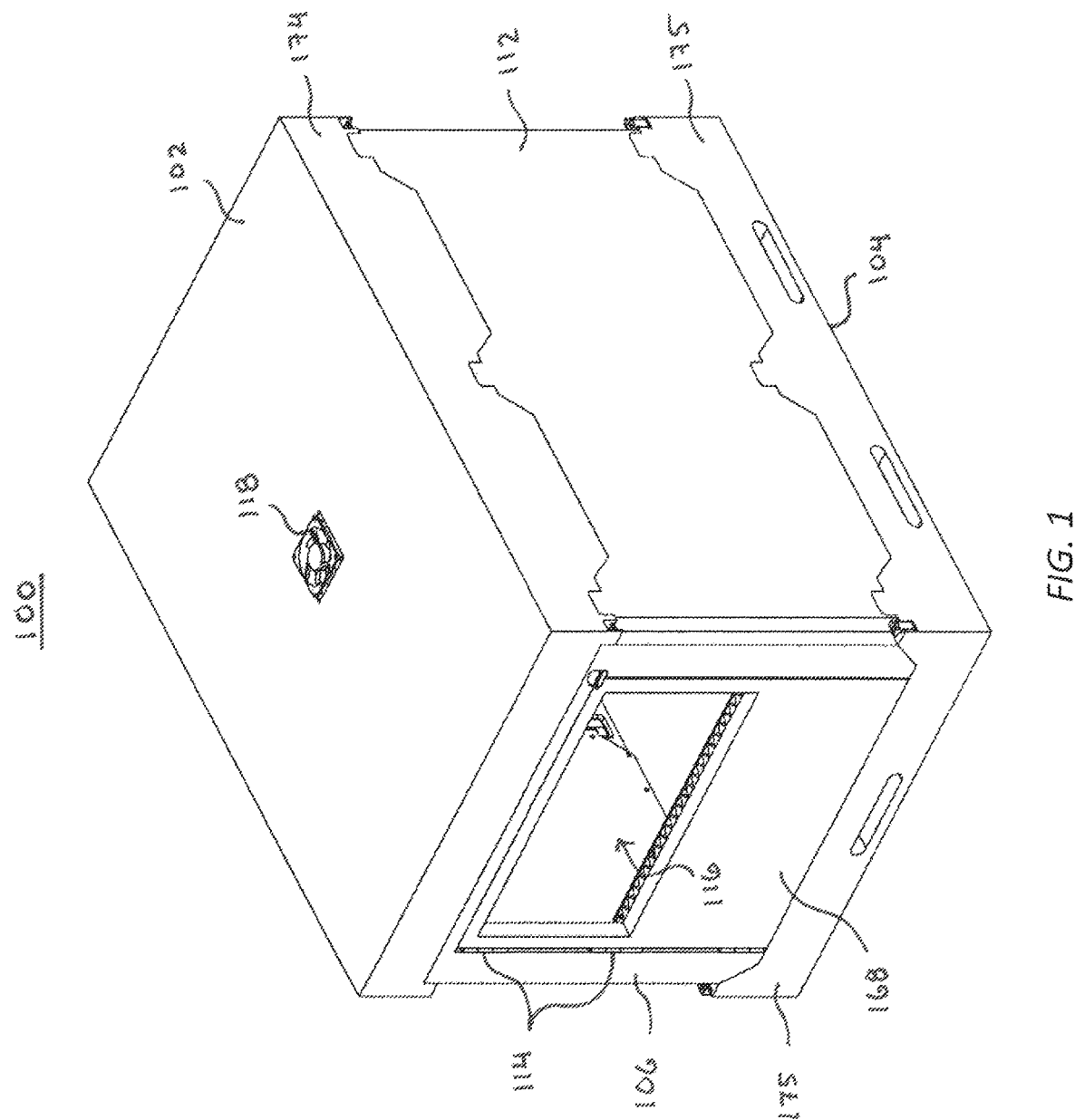
FIG. 1 is a frontal isometric view of one embodiment of a collapsible sound reducing pet container according to the invention.

FIG. 1 shows a frontal isometric view of one embodiment of a collapsible sound reducing pet container 100 according to the invention. In this view, container 100 is shown in its fully assembled, or expanded, condition in which it forms an enclosure. In a preferred embodiment, the enclosure so formed encloses a volume of about eight cubic feet, though this volume may be increased or decreased as desired. The container may be generally rectangular, having a top panel 102, a bottom panel 104, a front panel 106, a rear panel 108, a left panel 110, and a right panel 112. Preferably, all of these panels are formed as rigid plastic components using a conventional injection molding process. One or more of the panels may then provide structural support for adjoined multiple layers of dissimilar soundproofing materials, according to the invention. In addition, the panels may be shaped with interlocking features that allow the panels to be easily assembled or manually disassembled, as described in further detail below.

The front panel 102 may comprise or consist of a door having one or more hinges 114 on one side (for example, the left side as shown in the figure) that can be opened to provide egress for an animal such as a dog. A cutout 116 may be provided in the front wall to allow for light and air to enter the container 100 when the front panel 106 is closed. In one embodiment, the cutout 116 defines an area no greater than half the area of the front wall 106. In another embodiment, the cutout 116 defines an area that is approximately one eighth (or less) the area of the front wall 106. The cutout 116 may be covered by an air-permeable material such as a screen or mesh that allows airflow into and out of the container 100 but provides a sufficient mechanical barrier to prevent an animal from escaping the enclosure. An electric fan 118 may be mounted to the container 100 on any of the panels (other than bottom panel 104) to provide a means for ventilating the enclosure. For example, on container 100, the fan 118 is shown mounted to the top panel 102. The fan 118 may be selected for its ability to transmit audible white noise, to provide a soothing effect on an animal within the enclosure 100.

Figure 2:
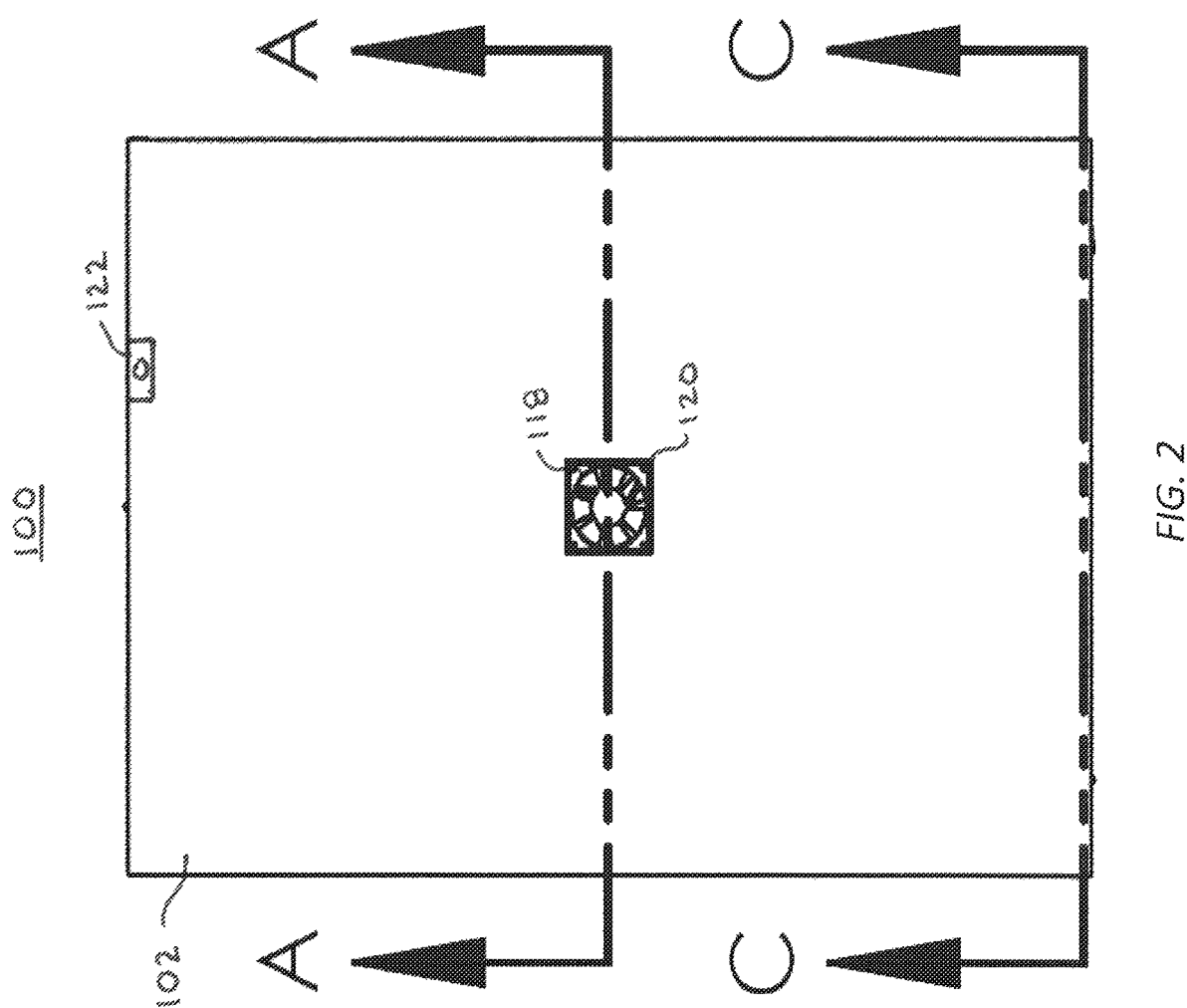
FIG. 2 is a top view of the container of FIG. 1.
Figure 20:
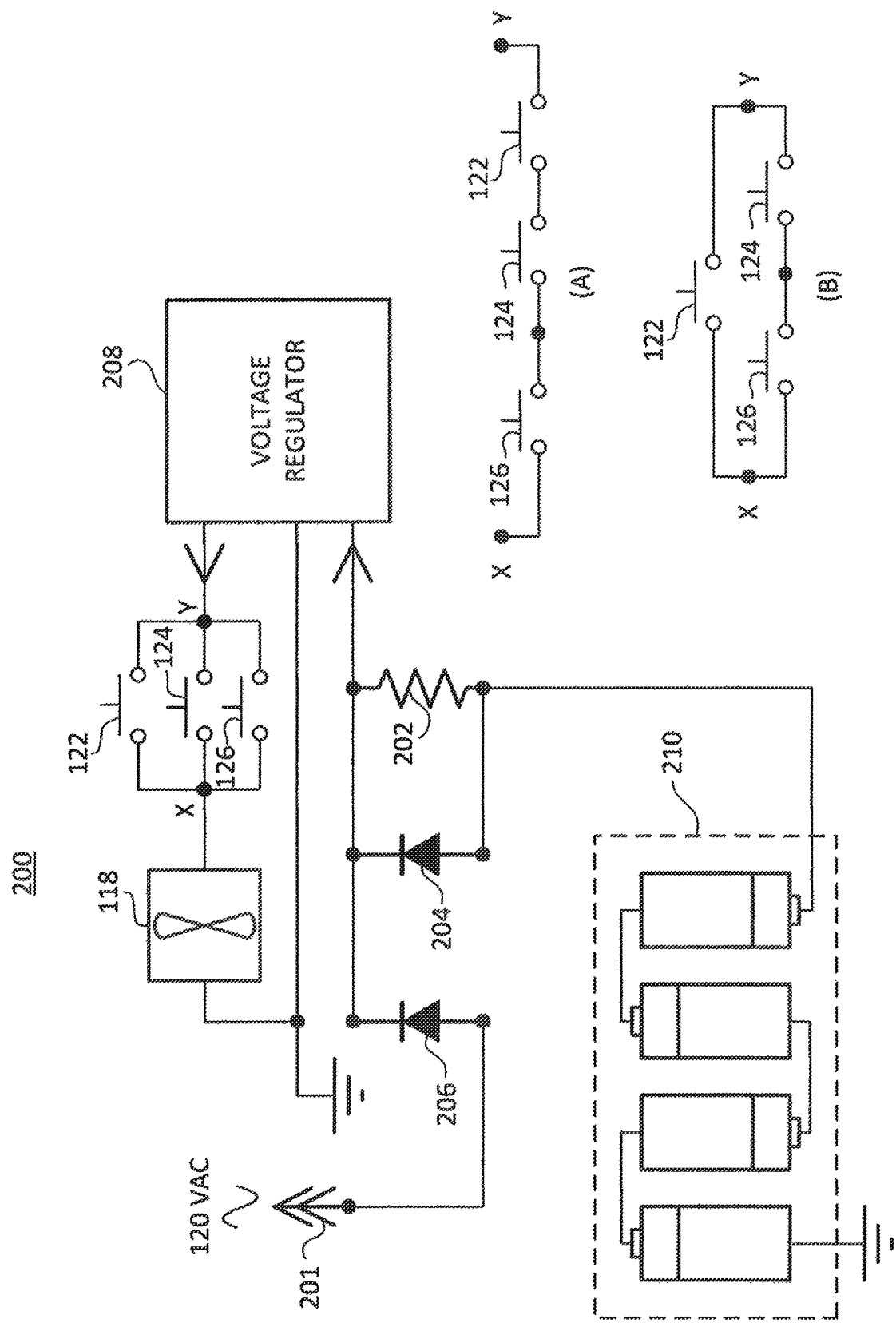
FIG. 20 shows a schematic diagram of one embodiment of an electrical circuit for providing power to a collapsible sound reducing pet container according to the invention.

FIG. 2 shows a top view of the top panel 102 of container 100. This view illustrates the configuration of top panel 102, whether container 100 is fully assembled or fully collapsed. This embodiment of the invention shows the fan 118 mounted through an aperture 120 cut through the approximate center of the top panel 102. In one embodiment, the fan 118 may be manually switched on and off by means of a locally mounted electric switch 122. In another embodiment, as an alternative to, or in addition to manual switch 122, a means for actuating or energizing the fan 118 may be provided in the form of a door switch 124 (FIG. 9) that closes when the door portion 168 of the front panel 106 is hinged closed. This way, the fan 118 can be automatically energized whenever the door 168 is closed. In another embodiment, the invention includes a means for energizing the fan 118 in response to sensing the presence of an animal within the enclosure 100. According to the invention, the presence of the animal may be detected by means of a contact or pressure switch 126 mounted to the bottom panel 104. For example, the switch 126 may be a pressure switch selected to actuate when under a load greater than about one pound. Or, the switch 126 may be a contact switch activated by a spring-loaded pushbutton or spring-loaded rocker arm that changes state in response to the weight of a small animal pressing against part of the bottom panel 104. In another embodiment, both the switch 124 and the switch 126 are connected in series with a power supply for the fan 118. By this arrangement, the fan 118 operates only when an animal is present within the enclosure and when the front panel 106 is hinged closed, to ensure adequate ventilation for an enclosed animal. Refer to FIG. 20, and the accompanying disclosure below, for further description of schemes for powering the fan 118.

Figure 3:
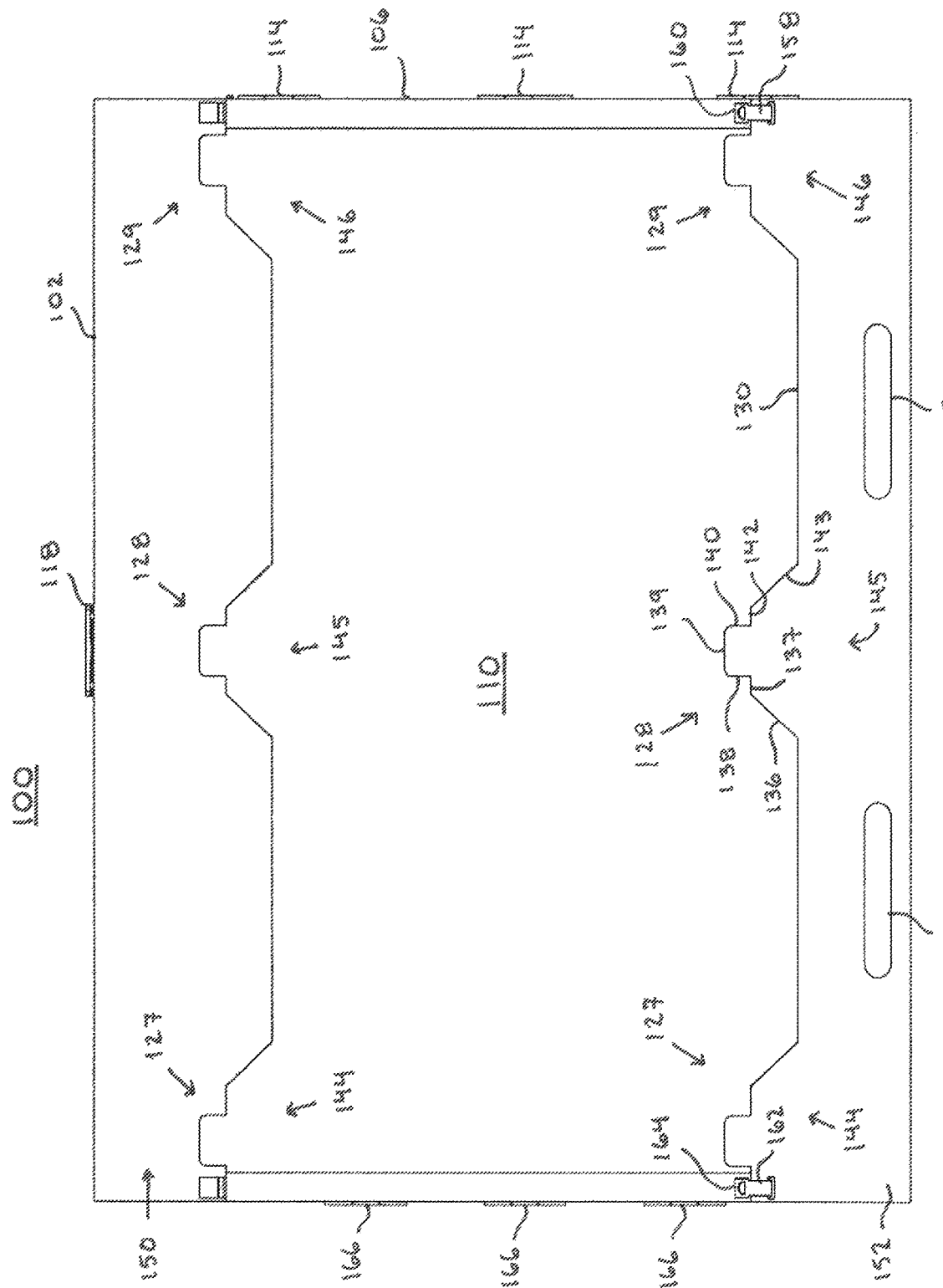
FIG. 3 is a left-hand side view of the container of FIG. 1.

FIG. 3 shows a left-hand side view of the fully assembled container 100. This view illustrates the configuration of left panel 110. The left panel 110 is generally planar and rectangular; however, the left panel is specifically configured with multiple keys 127, 128, 129 disposed along its lower edge 130 and with multiple keys 144, 145, 146 disposed along its upper edge 134. In the embodiment shown, the keys 127, 128, 129 each form a recess along the lower edge 130, and the keys 144, 145, 146 each form a protrusion along the upper edge 134. It is noted that other numbers of multiple recessing or protruding keys are possible within the scope of the invention.

Each key 128 has multiple edges that collectively define the shape of the key that is configured along a recessing or protruding border. For example, the border of recessing key 128 located midway along the lower edge 130 (the "middle" key) consists of a first angled edge 136, a first intermediate horizontal edge 137, a first vertical edge 138, an innermost horizontal edge 139, a second vertical edge 140, a second intermediate horizontal edge 142, and a second angled edge 143. The shape of this key 128 is symmetrical about a vertical axis that evenly bisects the figure. The keys 127 and 129 at the left and right ends, respectively (the "edge" keys), of the lower edge 130 have a shape similar to a portion of the shape of key 128. The middle key 145 disposed along the top edge 134 has a configuration similar to that of key 128, expect that key 145 protrudes from the top edge 134 whereas key 128 recesses from the lower edge 130. Protruding edge keys 144 and 146 have shapes similar to those of recessing edge keys 127 and 129, respectively. Various embodiments are possible within the scope of the invention wherein keys disposed along any panel edge may be shaped symmetrically, asymmetrically, similarly, or dissimilarly.

According to the invention, each recessing key formed in the edge of a panel is configured to engage a complimentary protruding key formed in the edge of an adjacent panel. For example, with reference again to FIG. 3, the left side view of the fully assembled container 100 shows the left side 150 of the top panel 102. Recessing keys 127, 128, and 129 are formed along the lower edge of the left side 150, and these recessing keys are complimentary in shape to the protruding keys 144, 145, and 146, respectively, of adjacent left panel 110. When the container 100 is assembled, the recessing keys 127, 128, and 129 of left side 150 engage protruding keys 144, 145, and 146 of left panel 110 to form a tight structural fit.

Similarly, FIG. 3 also shows the left side 152 of the bottom panel 104, and protruding keys 145, 146, 147 formed along the top edge of the left side 152. In a preferred embodiment, each side of the bottom panel 104 also defines one or more handle holes 154, to facilitate grasping and handling of the container 100. For illustrative purposes, the locations of fastening means and hinge components are also indicated in this figure. Pin 158 on lower panel 104 engages socket 160 on left panel 110 when assembling left panel 110 to lower panel 104. Hinges 114 provide a means for rotating a door portion 168 of front panel 106 between open and closed positions. Pin 162 on lower panel 104 engages socket 164 on right panel 112 when assembling the right panel 112 to the lower panel 104. Hinges 166 provide a means for rotating the rear panel 108 with respect to left panel 110 when expanding or collapsing the container 100.

Figure 4:
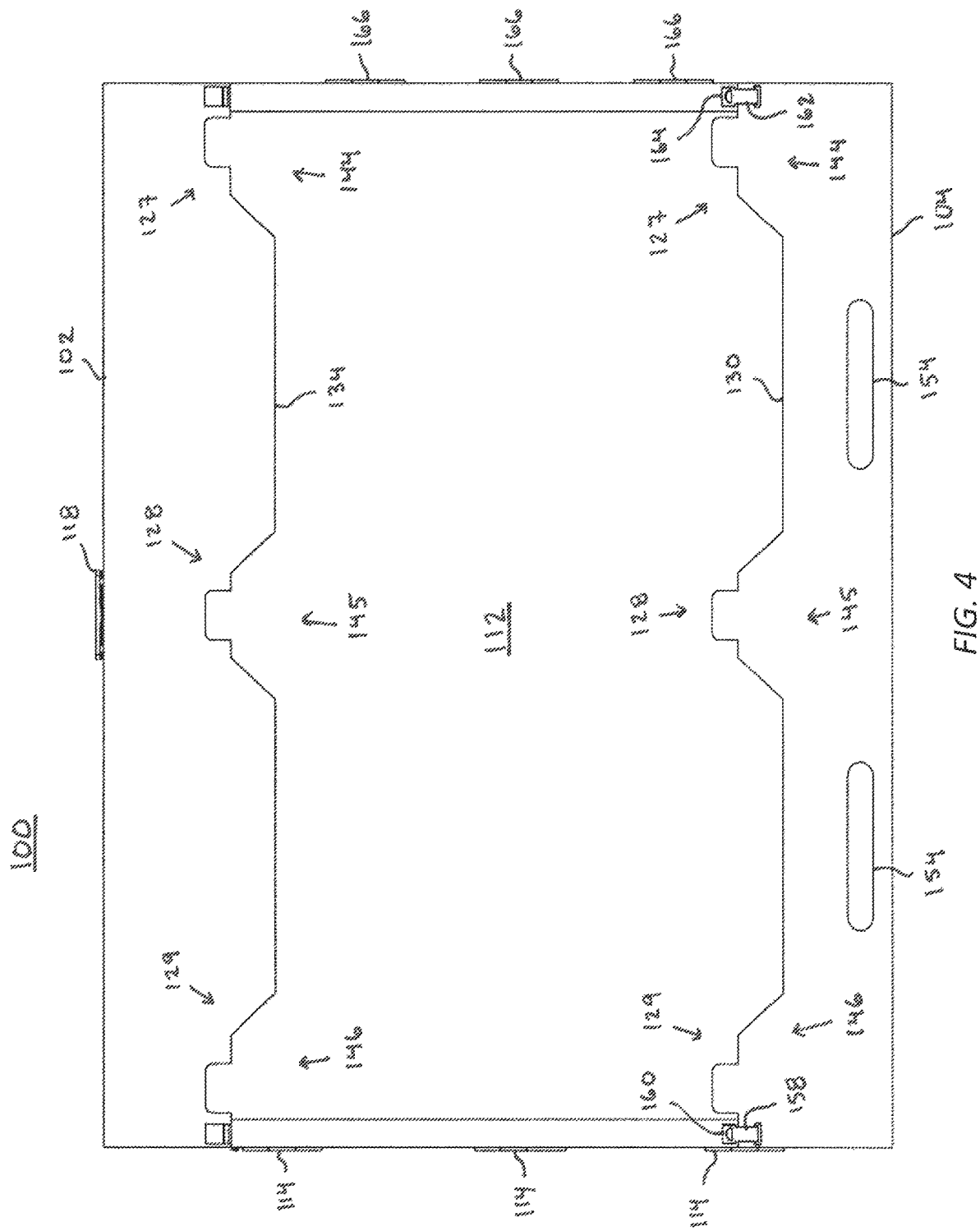
FIG. 4 is a right-hand side view of the container of FIG. 1.

FIG. 4 shows a right-hand side view of the fully assembled container 100. This view illustrates the configuration of right panel 112. The structure and function of right panel 112 is similar to that of left panel 110 as described in the preceding paragraphs.

Figure 5:
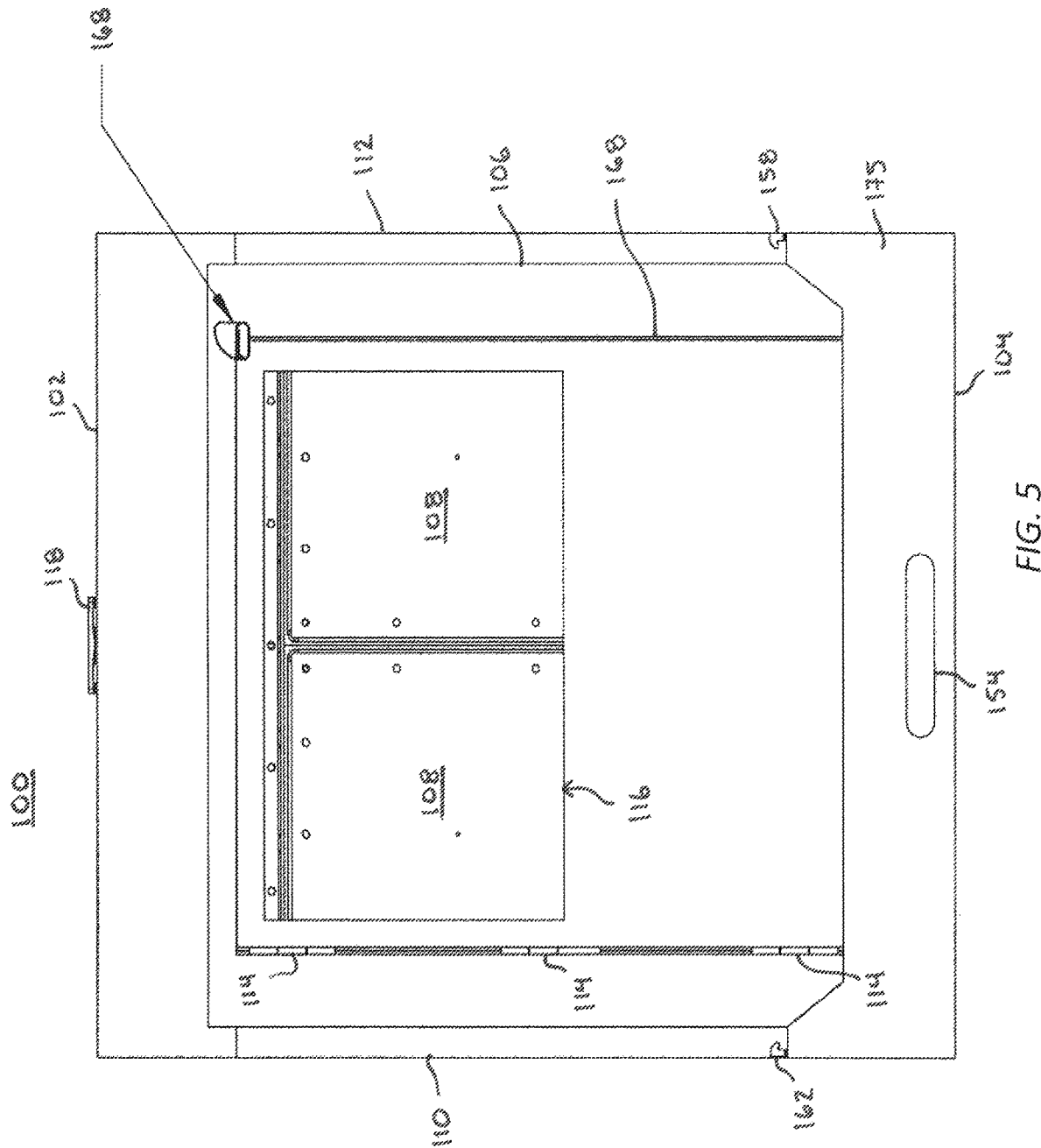
FIG. 5 is a frontal view of the container of FIG. 1.

FIG. 5 shows a frontal view of the container 100, in a fully assembled condition, to better illustrate the configuration of the front panel 106. In one embodiment, as shown in the figure, the front panel 106 may include a door portion 168, and a cutout 116 that is formed through the door portion. The door portion 168 enables a user to conveniently open and close a portal to allow an animal such as a pet dog to enter and exit the container, while the container is maintained in the fully assembled condition. Door portion 168 is configured to rotate about the hinges 114. A latch 168 may be provided, for example, at the upper left corner of the door portion, to maintain the door portion securely closed. In this view, for illustration purposes, the cutout 116 is shown without the normally installed screen or mesh cover, so that the right and left halves of the inside of rear panel 108 can be seen in this figure through the cutout 116.

Figure 6:
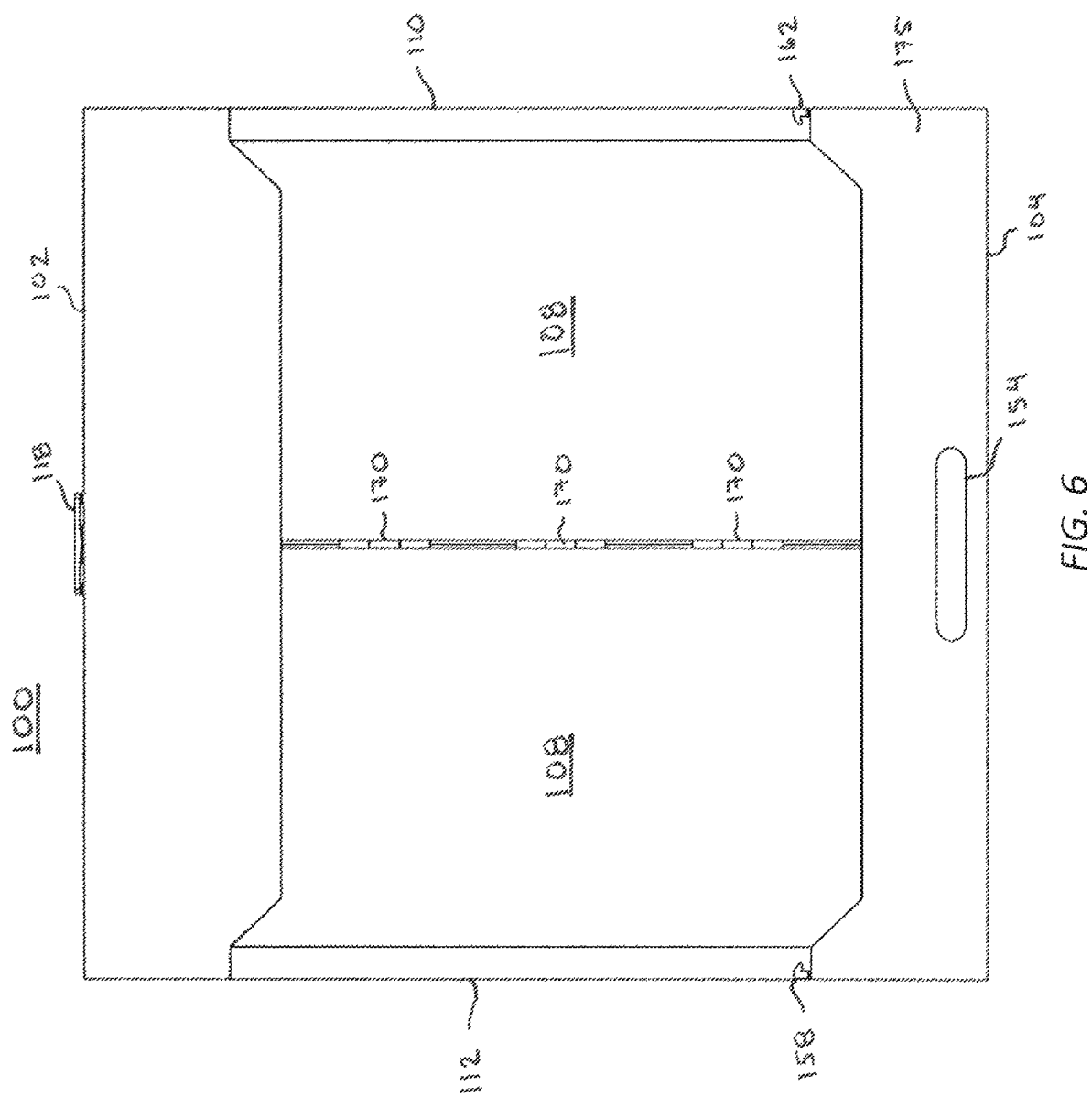
FIG. 6 is a rear view of the container of FIG. 1.

FIG. 6 shows a rear view of the container 100 in the fully assembled condition, to better illustrate the configuration of the rear panel 108. The rear panel 108 is hinged vertically down the middle, as shown, by hinges 170, thereby dividing the rear panel into left and right halves. When collapsing the container 100, this configuration allows the rear panel 108 to be folded vertically in half and then rotated inward about pin 162 to a position flush against an inner surface of the left panel 110. When expanding the container 100, the folded rear panel 108 may be rotated about pin 162 outward from the left-hand panel 110, and then unfolded and drawn toward the right panel. In a preferred embodiment, the side-to-side width of each half of rear panel 108 is no greater than the difference between the height of front panel 106 and the length of the bottom panel 104, to ensure a compact fit when collapsing the container (see FIGS. 15 and 16).

Figure 7:
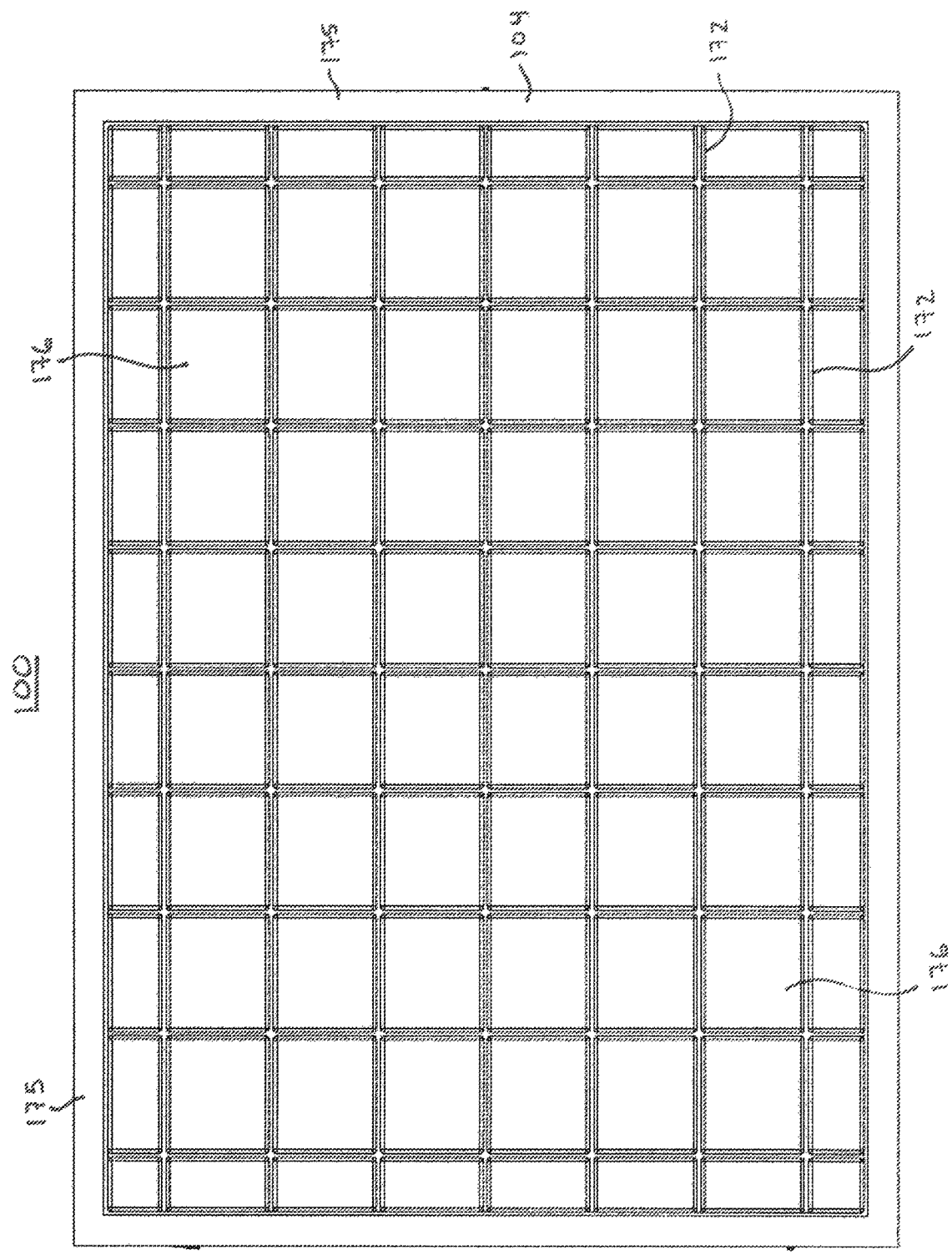
FIG. 7 is a bottom view of the container of FIG. 1.

FIG. 7 shows a bottom view of the container 100, to illustrate the configuration of the underside of the bottom panel 104. In one embodiment, the underside of bottom panel 104 comprises a grid-like pattern of parallel and perpendicular ribbing, or rails, 172 that are framed within the sides 175 of the bottom panel 104. The ribbing pattern may be formed, for example, from plastic material that is suitable for use in a conventional injection molding process. In one embodiment, each individual rail 172 may be about ⅛ inch thick and about ⅞ inch high. Other rail dimensions are possible within the scope of the invention. By forming the underside of the bottom panel 104 in this manner, a container according to the invention advantageously provides a sturdy, yet lightweight structure for supporting the upper panels and the weight of an animal enclosed therein. This configuration also ensures adequate friction and slip resistance for the assembled container. The rectangular spaces defined between intersecting ribs comprise a continuous planar surface, or floor 176, attached to the top edge of the ribs 172. The ribs 172, sides 175, and floor 176 are preferably formed as a single plastic component using the aforesaid injection molding process.

Figure 8:
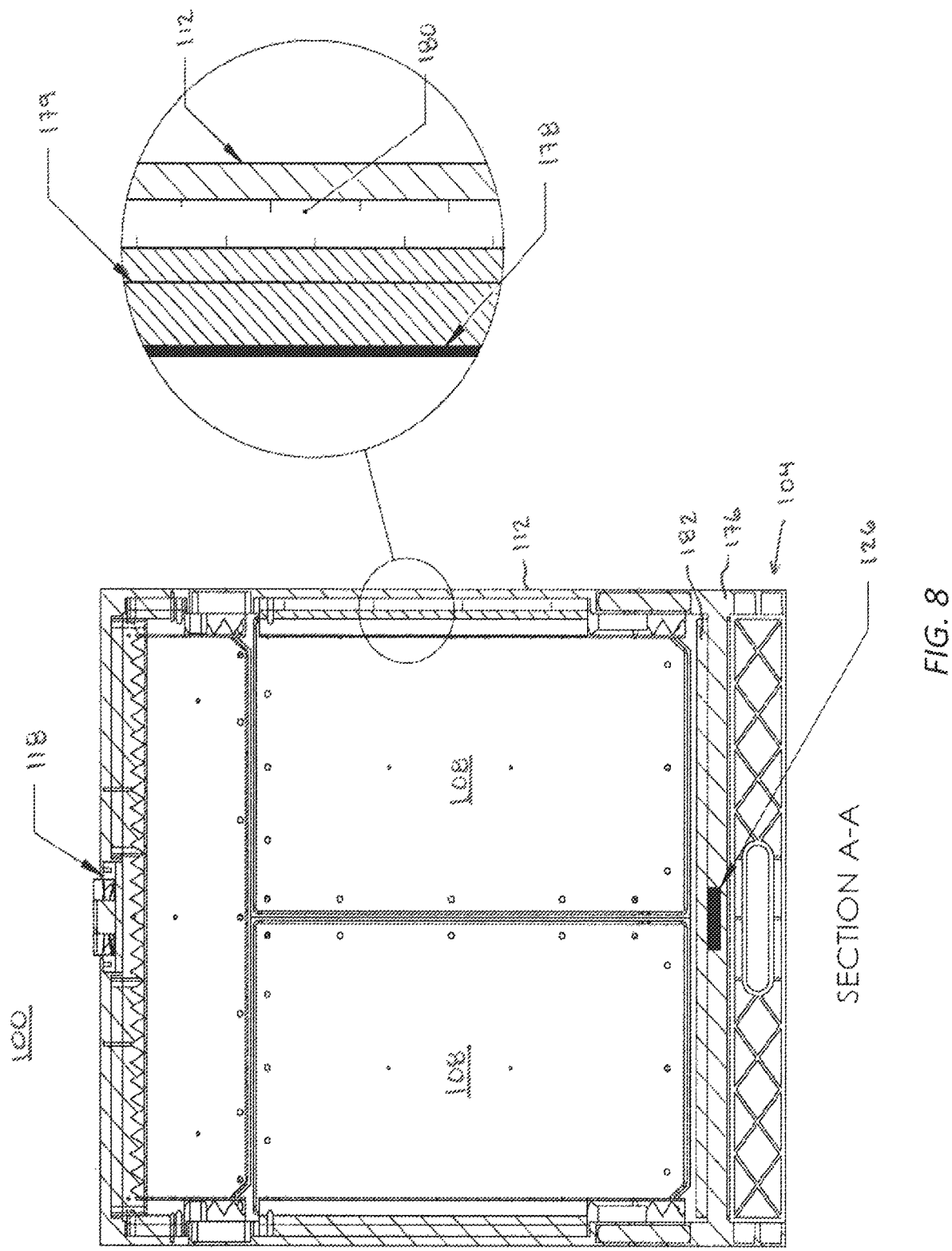
FIG. 8 shows a cross sectional view of the container of FIG. 1 taken along section A-A.

FIG. 8 shows a cross sectional view of layered walls of the container of FIG. 1 taken along section A-A, with the container in a fully assembled condition. This view illustrates a means for reducing sound propagation through the panels of the container 100. According to the invention, the wall of each panel (102, 104, 106, 108, 110, 112) may comprise multiple layers of dissimilar soundproofing material. In total, the thickness of each panel wall may be about 1 to 2 inches. To illustrate one example of a configuration of multiple dissimilar layers of soundproofing material, a magnified cross-sectional image of a portion of right panel 112 is shown to the right of section A-A. In this example, the first layer 178 of soundproofing material comprises an elastomer, such as a neoprene sheet or mass loaded vinyl, which is disposed along the innermost surface of the wall. A second layer 179 of soundproofing material may comprise a panel of acoustic foam or fiberglass, such as those manufactured by Auralex® Acoustics. A third layer 180 of soundproofing material may comprise a more rigid acoustic board, such as those distributed by Acoustical® Solutions. The acoustic board 180 provides a rigid surface to which the first layer 178 and second layer 179 may be attached by rivets or other conventional fasteners. The acoustic board 180 may be attached to the wall exterior, which comprises the injection-molded plastic material of right panel 112, and which may also be considered a layer of soundproofing material. This attachment of acoustic board 180 to right panel 112 may be effected by an adhesive, or by the same fastening means that connects together the multiple dissimilar layers. In one configuration, the multiple dissimilar soundproofing layers are held in place by means of one or more pegs that run through the layers and into the acoustic board 180 and optionally also into the right panel 112. In one embodiment, the pegs comprise threaded fasteners. In another embodiment, five such pegs are provided in each wall—one in the middle and one near each of the four corners of the wall. In another embodiment, the multiple layers may be arranged in a stacked configuration that allows for narrow air gaps to remain between any two adjacent layers. Section A-A also shows one possible location for switch 126, mounted between a floor plate 182 and floor 176.

According to the invention, the multiple dissimilar layers of soundproofing material block a wider spectrum of acoustic frequencies from passing through the panels of the container 100, than would be blocked by only one of the layers acting alone. The need for multiple dissimilar layers arises from the container's design basis for (1) protecting human ears from animal noise leaving the container, and (2) protecting an animal's ears from external noise entering the container. For example, the human ear is known to detect acoustic frequencies in the range from about 64 Hz to about 23 kHz, while a dog's ear is known to detect acoustic frequencies in the range from about 67 Hz to about 45 kHz. The feline ear has an even broader frequency range, being able to detect acoustic frequencies from about 45 Hz to about 64 kHz. Thus, to the human ear, a soundproofing material that blocks frequencies up to 23 kHz would be effective for muffling sounds that emanate from a pet container; however, the same material would not necessarily shield the animal's ears from external noise propagating at frequencies between 23 kHz and 64 kHz. To ensure that the walls of container 100 suppress noise across a frequency range that spans the acoustic range of human and animal ears alike, the panels of container 100 comprise multiple layers of dissimilar soundproofing material having overlapping frequency responses that function as a single, broad spectrum, soundproofing system.

Figure 9:
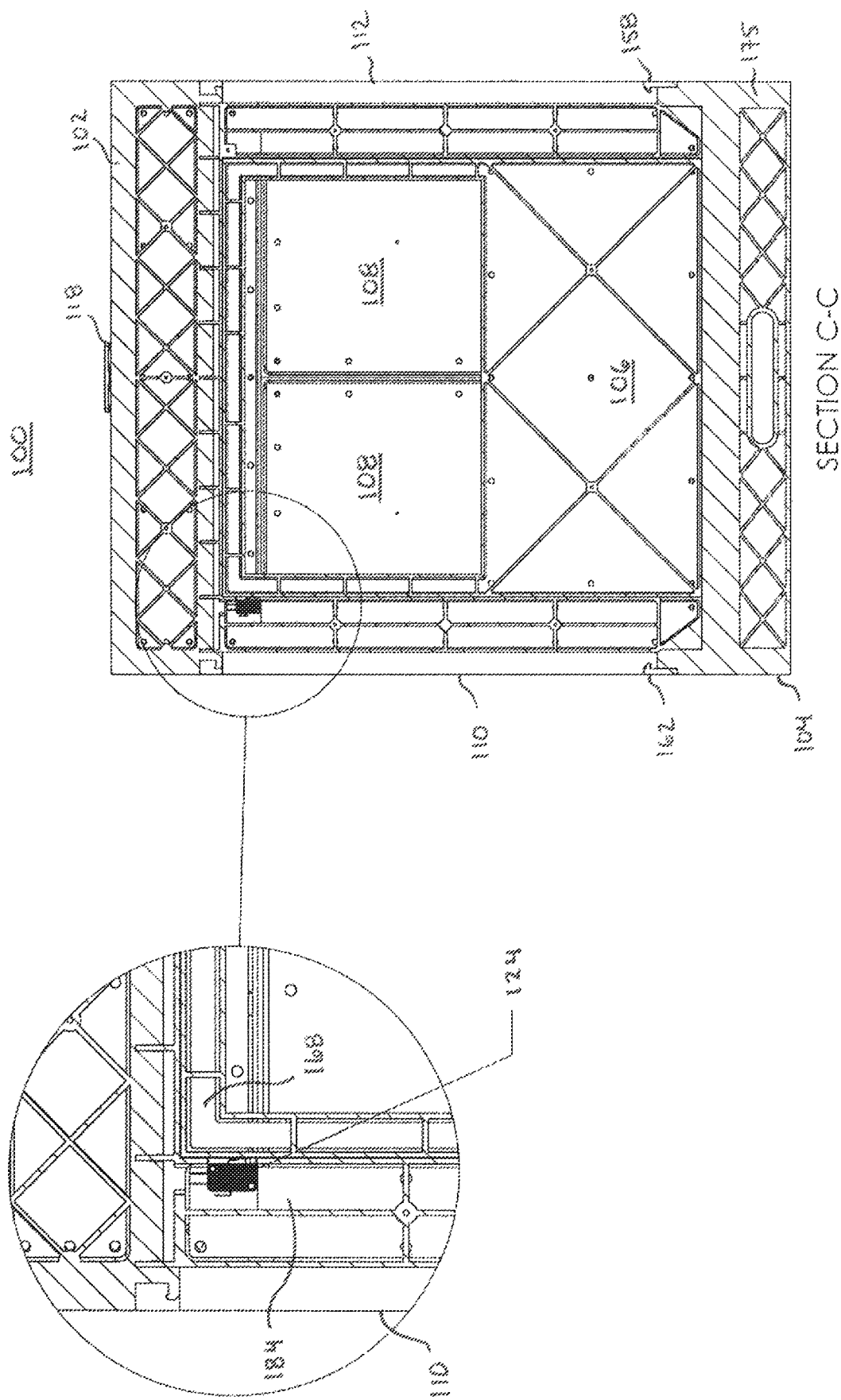
FIG. 9 shows a cross sectional view of a front panel of the container of FIG. 1 taken along section C-C.

FIG. 9 shows a cross sectional view of a front panel of container 100 in a fully assembled condition taken along section C-C. To better illustrate the placement of door switch 124, a magnified cross-sectional image of a portion of left panel 110 is shown to the left of section C-C. In this example, switch 124 is shown mounted to an upper left corner 184 of front panel 106, so that a pushbutton or lever arm integral to switch 124 will be actuated, and cause the switch to change electrical state, whenever the door portion 168 rotates against switch 124 as a result of the door being closed.

FIG. 9 additionally demonstrates the mounted position of panels 110 and 112 relative to the bottom panel 104. In the fully assembled configuration of this embodiment of the invention, each left and right panel sits upright with respect to the bottom panel and each is held in place via friction fit by pin-to-socket and key-to-key engagement with other panels of the container.

Figure 10:
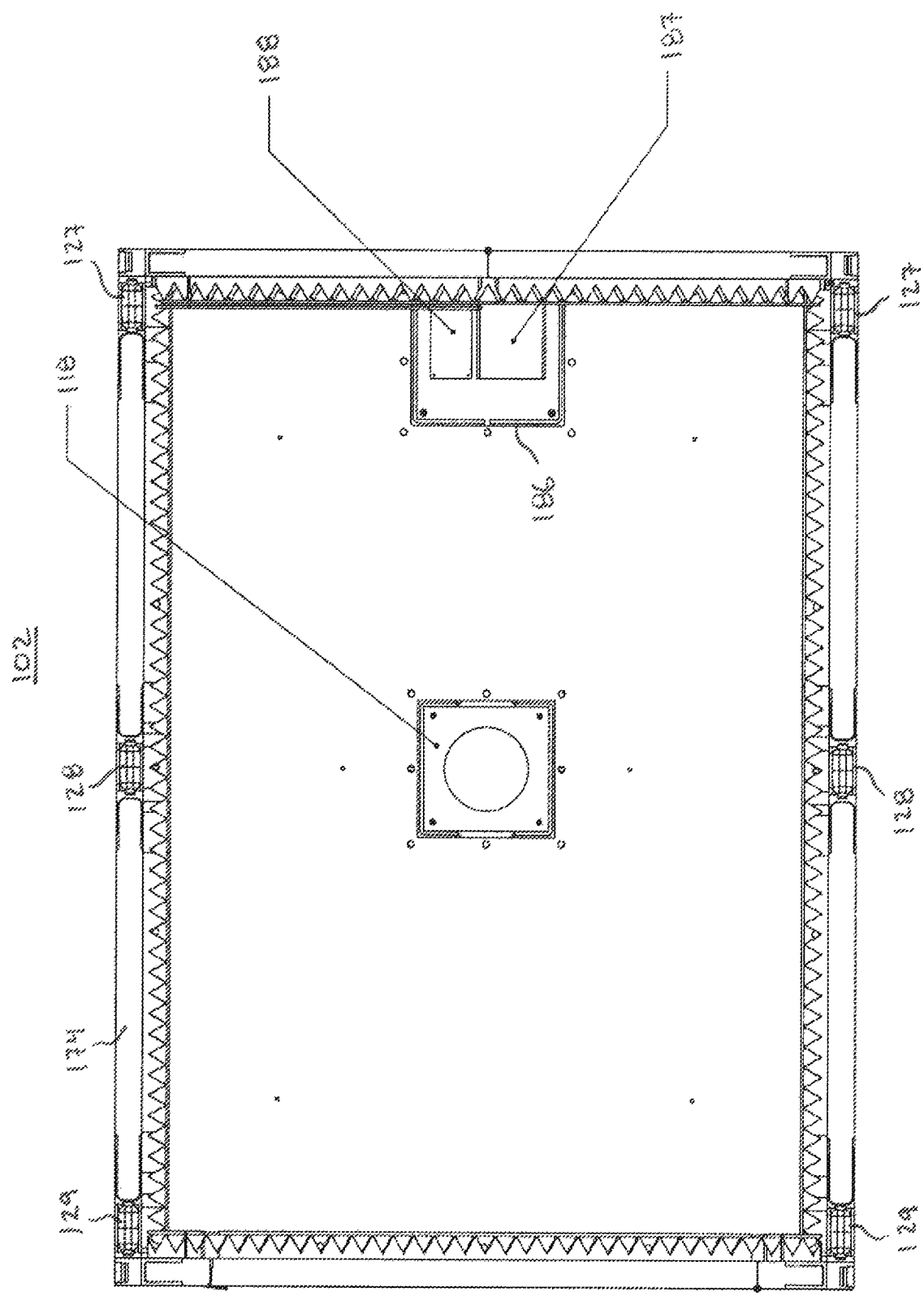
FIG. 10 is an underside view of a top panel of the container of FIG. 1.

FIG. 10 shows an underside view of the top panel 102 of the container 100. This view illustrates mountings locations for various electrical components. The fan 118 is shown penetrating the top panel 102 at center. A housing 186 is mounted adjacent to the rear end of panel 102. The housing 186 may be of plastic or metal construction, such as is commonly used for electrical junction boxes. The housing encloses the electrical circuit components that provide power to the fan 118, some of which are shown in the schematics of FIG. 20. A circuit board 187 contains components such as resistor 202, diodes 204 and 206, and voltage regulator 208. A battery pack 210 is mounted adjacent to the circuit board 187. Wiring, power cable, and electrical connections are conventional in nature and are not shown in the figures. Recessing keys 127, 128, and 129 are shown located around the perimeter of side 174 of top panel 102.

FIGS. 11 through 18 illustrate dynamic steps for collapsing a collapsible sound reducing pet container 100 according to the present invention. To expand or assemble the container 100, the steps may be performed in reverse order.

Figure 11:
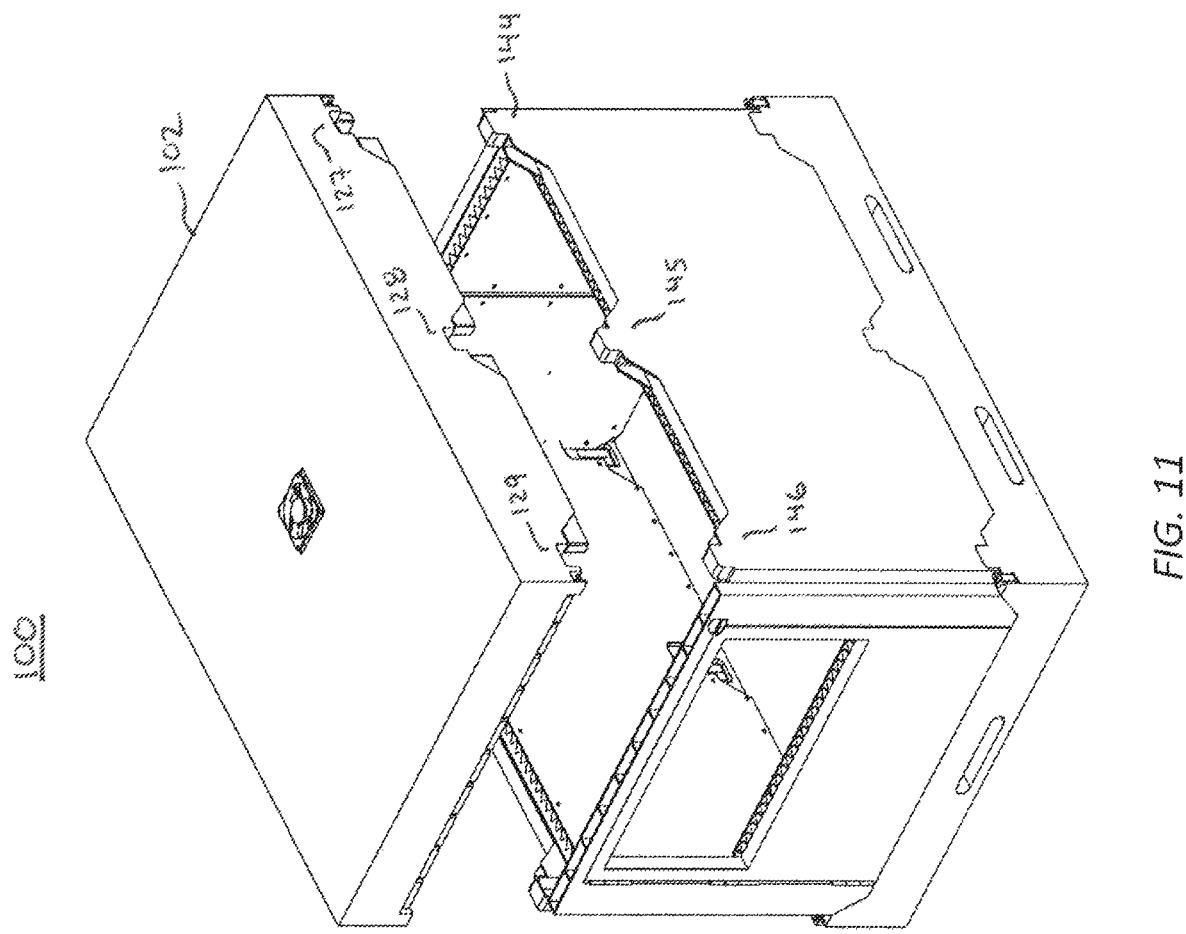
FIG. 11 is a frontal isometric view illustrating an initial step in a process for collapsing the container of FIG. 1, wherein the top panel is removed.

FIG. 11 shows a frontal isometric view illustrating an initial step in a process for collapsing the container 100. The top panel 102 is lifted off of the container 100 to allow for lifting and manipulation of the remaining panels in the collapsing process. In the initial state of this embodiment of the invention, the container can be said to be in its expanded or fully assembled configuration. The top panel 102 is removed from the assembly and set aside until the final step. When assembling the container 100, recessing keys 127, 128, and 129 are aligned with protruding keys 144, 145, and 146, as shown, then the panel 102 is connected by friction-fit to the side panels.

Figure 12:
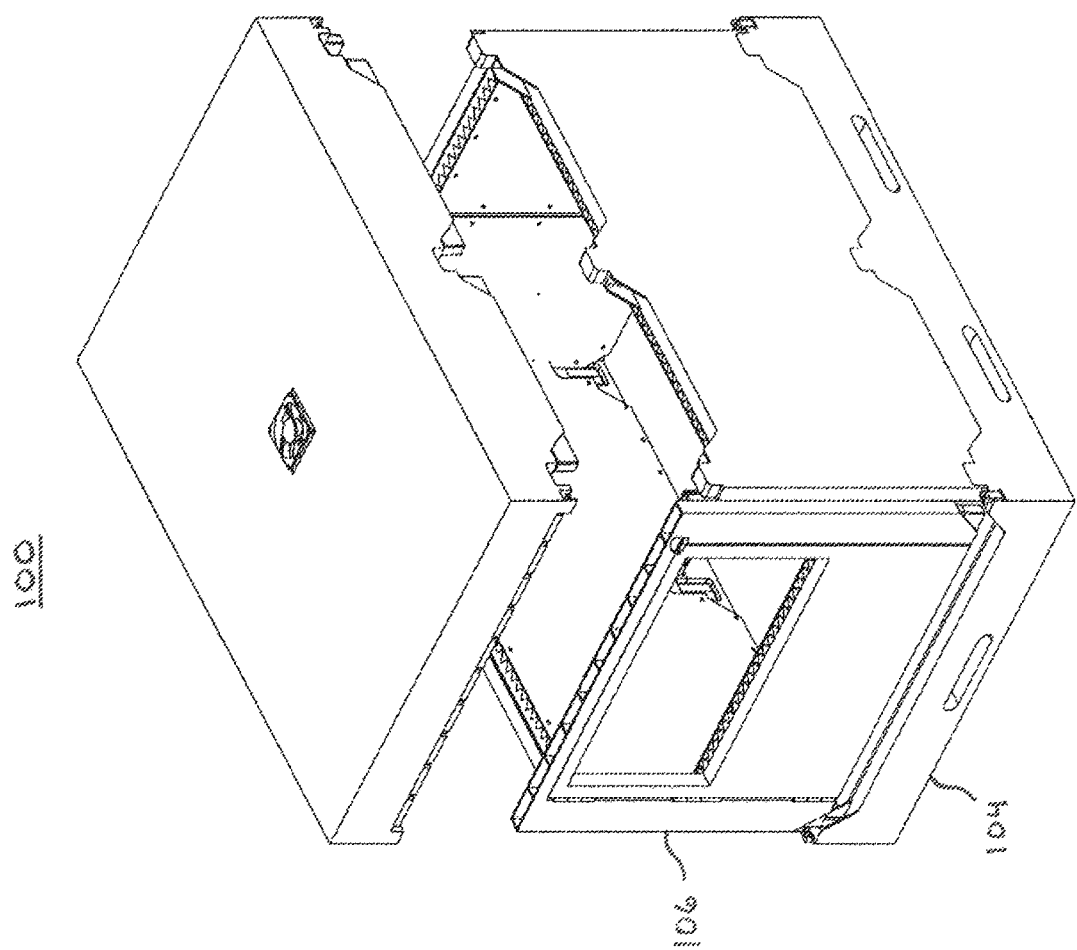
FIG. 12 is a frontal isometric view illustrating a subsequent step in the process for collapsing the container of FIG. 1, showing the front panel being lifted from a mounted position in a bottom panel.

FIG. 12 shows a frontal isometric view illustrating a subsequent step in the process for collapsing the container 100. In this step, the front panel 106 is lifted from its mounted position in the bottom panel 104.

Figure 13:
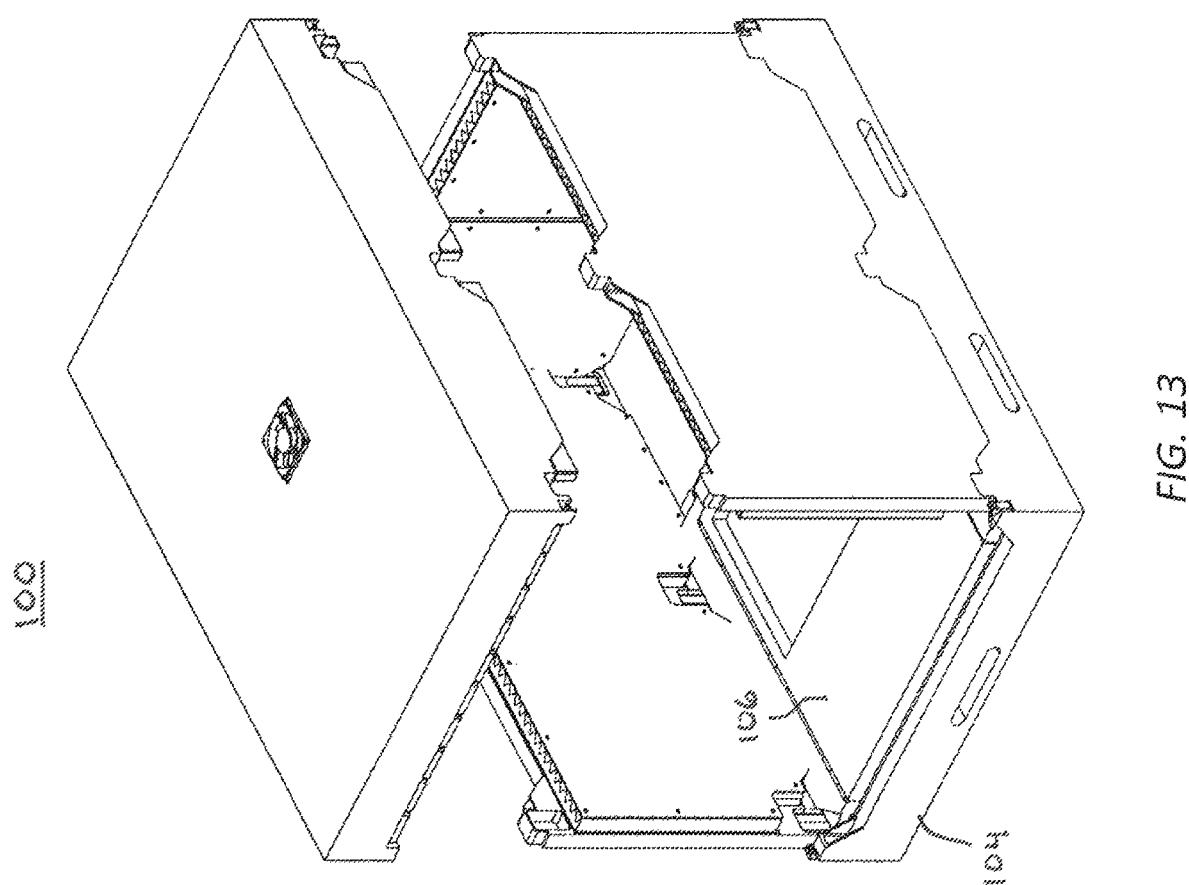
FIG. 13 is a frontal isometric view illustrating a subsequent step in the process for collapsing the container of FIG. 1, showing the front panel folded down to rest on the bottom panel.

FIG. 13 shows a frontal isometric view illustrating a subsequent step in the process for collapsing the container 100. In this step, the front panel 106 is placed inward and downward to rest on top of the bottom panel 104. Subsequent steps will place other panels around and atop the front panel so that the panel will be held to this position while the container 100 is in the collapsed configuration.

FIG. 14 includes frontal (A) and isometric (B) views illustrating a subsequent step in the process for collapsing the container 100. In this step, the left panel 110 and the rear panel 108 are lifted from their mounted positions in the bottom panel 104. Note that lifting the rear panel 108 separates socket 160 from pin 158, and separates socket 164 from pin 162 (FIG. 3). When assembling the container 100, the recessing keys on the lower edge of the left panel 110 are aligned with their complimentary protruding keys on the lower panel 104, the pins 158, 162 are aligned with sockets 160, 164, then the left panel 110 is connected thereto by friction-fit.

FIG. 15 includes frontal (A) and isometric (B) views illustrating a subsequent step in the process for collapsing the container 100. In this step, the rear panel 108 is folded by means of its central hinge 170, and the folded panel 108 is then positioned flush against the interior of the left panel 110.

FIG. 16 includes frontal (A) and isometric (B) views illustrating a subsequent step in the process for collapsing the container 100. In this step, the left panel 1101 is placed inward and downward to rest on the collapsed front panel 106. This action also places the rear panel 108 inward and downward to rest on the top surface of bottom panel 104, in an area not reached by the collapsed front panel 106. This compact packaging feature is made possible by ensuring that the side-to-side width of each half of rear panel 108 is no greater than the difference between the height of front panel 106 and the length of the bottom panel 104.

FIG. 17 includes frontal (A) and isometric (B) views illustrating a subsequent step in the process for collapsing the container 100. In this step, the rightpanel 112 is lifted from a mounted position in the bottom panel 104. This action separates socket 160 from pin 158, and separates socket 164 from pin 162 (FIG. 4). When assembling the container 100, recessing keys 127, 128, and 129 are aligned with protruding keys 144, 145, and 146, sockets 160, 164 are aligned with pins 158, 162, then the panel 112 is connected by friction-fit to the lower panel 104.

FIG. 18 includes frontal (A) and isometric (B) views illustrating a subsequent step in the process for collapsing the container 100. In this step, the right panel 112 is placed inward and downward to rest on top of the collapsed left panel 110. Panels 104, 106, 108, 110, and 112 are now stacked on one another as shown.

FIG. 19 includes frontal (A) and isometric (B) views illustrating the final step in the process for collapsing the container 100. In this step, the top panel 102 is placed on top of the bottom panel 104 so that the recessing keys 127, 128, 129 of the top panel 102 engage the complimentary protruding keys 144, 145, 146 of the bottom panel 104, thereby enclosing the collapsed front, rear, left, and right panels. Advantageously, top panel 102 serves as a lid for the collapsed assembly, fitting snugly to the exterior structure of the bottom panel to encapsulate the collapsed panels of the container. In this final state of this embodiment of the invention, the container 100 is said to be in its fully collapsed condition.

FIG. 20 shows a schematic diagram of one embodiment of an electrical circuit 200 for providing power to the fan 118 on a collapsible sound reducing pet container according to the invention. The diagram illustrates alternative switching schemes in (A) and (B).

Circuit 200 may be designed to draw power from either a conventional 120 VAC power source 201 or from a DC battery pack 210. The battery pack 210 may include one or more rechargeable batteries, such as lithium ion batteries, arranged in a series configuration to achieve a desired DC voltage. A battery charger or rectifier may be provided, for example, by resistor 202 and diodes 204, 206 to rectify AC voltage when drawing power from the source 201 or when recharging the battery pack 210. Resistor 202 may be selected to drop voltage to a desired level for recharging. Voltage regulator 208 may be provided to convert rectified power to a constant DC level, or otherwise ensure a constant DC output at a level according to the rating of fan 118.

Whether fan 118 receives DC power from voltage regulator 208 depends on the switching scheme desired for use, and on the state of each switch 122, 124, and 126, where switch 122 is the manual switch, switch 124 is the door switch, and switch 126 is the pressure switch. According to the invention, any combination of one or more of these switches is possible, with the switches arranged in series or parallel configurations between nodes X and Y. For example, one scheme uses only the manual switch 122 between nodes X and Y, so that the fan 118 may be exclusively controlled by a user. In another example, only the door switch is used, so that the fan 118 will turn on whenever the door 168 on front panel 106 is closed. In another example, only the pressure switch is used, so that the fan 118 will turn on when an animal located inside the container 100. In another example, any two of the three switches are wired in series, so that two conditions must be true in order for the fan 118 to receive power. In another example, as shown in optional circuit (A), all three switches are wired in series. In another example, any two of the switches are wired in series, with that series combination wired in parallel with the third switch. In another example, only switches 124 and 126 are used, and are wired in series. This scheme ensures that fan 118 will turn on only when an animal is present within the container 100 when the door 168 is closed. In one preferred embodiment, as shown in optional circuit (B), the manual switch 122 is added to the previous configuration, and wired in parallel with the series combination of switches 124 and 126.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A pet container, comprising:
   top, bottom, front, rear, left, and right panels, the panels configured for assembly to form an enclosure having a fully assembled volume, the panels further configured to allow the assembled enclosure to be collapsed by detachment of the front, rear, left, and right panels from the top and bottom panels and by containment of the front, rear, left, and right panels within a fully collapsed volume defined only by the top and bottom panels;
   a door formed through the front panel, the door configured to open to provide egress for the pet to and from the enclosure when the enclosure is fully assembled, and to close to enclose the pet within the enclosure when the enclosure is fully assembled, the door defining a cutout having an area less than half that of the front panel;
   the cutout configured to prevent the pet from escaping the fully assembled enclosure through the cutout and to allow light and air to enter the fully assembled enclosure when the door is closed;
   at least one of the panels comprising multiple layers of dissimilar soundproofing material;
   an electric fan mounted to one of the panels;
   an electric power source mounted to one of the panels;
   a pressure switch configured to close under weight of the pet on the bottom panel; and a door switch electrically coupled to the power source, to the pressure switch, and to the electric fan and configured to close in response to closure of the door and to thereby energize the fan only when the door is closed and when the weight of the pet presses on the bottom panel.

2. The pet container of claim 1 wherein the enclosure having the fully assembled volume defines an internal volume of about eight cubic feet.

3. The pet container of claim 1 further comprising an air permeable material covering the cutout.

4. The pet container of claim 1 wherein the cutout has an area less than one eighth that of the front panel.

5. The pet container of claim 1 wherein the multiple layers of dissimilar soundproofing material include (a) acoustic foam and (b) sound board covered in an elastomer.

6. The pet container of claim 5 wherein the layer of acoustic foam is adjacent to the layer of sound board covered in mass loaded vinyl.

7. The pet container of claim 1 wherein at least one of the panels comprises an inner liner and an outer plastic structure, wherein the multiple layers of dissimilar soundproofing material are located between the inner liner and the outer plastic structure.

8. The pet container of claim 7 wherein the inner liner comprises neoprene.

9. The pet container of claim 1 wherein the electric fan is mounted to the top panel to force air therethrough.

10. The pet container of claim 1 configured to automatically energize the electric fan when the door is closed and when the pet is present within the fully assembled enclosure.

11. The pet container of claim 1 wherein the top panel further comprises means for engaging the bottom panel.

* * * * *